United States Patent
Oi et al.

(10) Patent No.: US 6,388,031 B1
(45) Date of Patent: *May 14, 2002

(54) ETHYLENE-ALKENYL AROMATIC COMPOUND COPOLYMER, PROCESS FOR THE PRODUCTION THEREOF, AND MOLDED ARTICLE THEREOF

(75) Inventors: Nobuo Oi, Narashino; Yuki Iseki, Sodegaura; Yasuro Suzuki, Kisarazu, all of (JP)

(73) Assignee: Sumitomo Chemical Company, Limited, Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 24 days.

(21) Appl. No.: 09/471,254

(22) Filed: Dec. 23, 1999

(30) Foreign Application Priority Data

Dec. 25, 1998 (JP) ............................................. 10-370831
Mar. 4, 1999 (JP) ............................................. 11-056982

(51) Int. Cl.⁷ ...................... C08F 210/02; C08F 210/18; C08F 4/44
(52) U.S. Cl. ...................... 526/160; 526/127; 526/943; 526/347.1; 526/347; 526/161; 502/152
(58) Field of Search ............................. 526/347, 347.1, 526/161, 943, 127; 502/152

(56) References Cited

U.S. PATENT DOCUMENTS 6,121,401 A * 9/2000 Yamamoto et al. ...... 526/348.6
6,184,319 B1 * 2/2001 Sato et al. ................. 526/161
6,187,889 B1 * 2/2001 Oi et al. ...................... 526/347

FOREIGN PATENT DOCUMENTS

| EP | 0416815 A2 | 3/1991 |
| EP | 764653 A2 | 3/1997 |
| EP | 764664 A2 | 3/1997 |
| EP | 0842939 A1 | 5/1998 |
| EP | 911346 A2 | 4/1999 |
| EP | 0970976 A1 | 2/2000 |
| FR | 2787113 | 6/2000 |
| JP | 9309925 A | 12/1997 |

OTHER PUBLICATIONS

Karjala, Teresa Plumley et al., ANTEC, vol. 729, 1997, pp. 1086–1090.
Sernetz, Freidrich G. et al., Journal of Polymer Science, vol. 35, 1997, pp. 2549–2560.
Kumar, K. Rajesh et al.; "Copolymerization of Ethylene with Aromatic Vinyl Monomers Using Metallocenes"; Int. Symp. Adv. Polym. Technol. vol. 1, 18–21 (1998).

* cited by examiner

Primary Examiner—David W. Wu
Assistant Examiner—R. Harlan
(74) Attorney, Agent, or Firm—Birch, Stewart, Kolasch & Birch, LLP

(57) ABSTRACT

An ethylene-alkenyl aromatic compound copolymer, the copolymer having a melt viscosity $\eta^*_{190}$ at a shear rate of 100 radian/second at 190° C. of $3.0 \times 10^3$ to $3.0 \times 10^6$ poises, and a molecular weight distribution in terms of weight average molecular weight(Mw) to number average molecular weight(Mn) [Mw/Mn] of 1.2 to 4.0, and wherein a zero-shear melt viscosity $\eta^*_0$ (poise) and a characteristic relaxation time $\tau_0$ (second) satisfy the relation of the expression (1) below;

$$\log \tau_0 > \log \eta^*_0 - 6.38 \qquad (1)$$

14 Claims, 1 Drawing Sheet

ETHYLENE-ALKENYL AROMATIC COMPOUND COPOLYMER, PROCESS FOR THE PRODUCTION THEREOF, AND MOLDED ARTICLE THEREOF

BACKGROUND OF THE INVENTION

1. Field of the Invention

The present invention relates to an ethylene-monoalkenyl aromatic compound copolymer having good processing properties, a process for the production thereof, and a molded article thereof.

2. Description of the Related Arts

In general, an elastic recoverability, a transparency and a mechanical strength found in a polyvinyl chloride are required for a copolymer to be used as various films such as a stretch film, a shrink film, a wrap film and the like. However, the polyvinyl chloride comes in question concerning environmental pollution because of the possibility of generation of harmful substances at incineration, etc. Various kinds of polymers are presently considered as a replacement for the polyvinyl chloride, but it is the status quo that none of them have been obtained that are satisfactory from the viewpoints of viscoelastic properties and transparency.

In recent years, progress has occurred that in the field of polymerization of olefins such as ethylene and propylene. Particularly, a polymer having characteristics different from conventional polymers can be produced, and an extremely small amount of catalyst can produce a large amount of polymer, because of the use of catalysts using a transition metal compound such as a so-called metallocene, a non-metallocene or the like.

An application of such a catalyst to the copolymerization of ethylene with an alkenyl aromatic hydrocarbon represented by styrene has been proposed. For example, a pseudo-random copolymer (a random copolymer wherein methine carbon atoms with which a phenyl group is bonded are mutually separated by 2 or more of methylene groups without fail) of ethylene with styrene obtained by using a so-called homogeneous Ziegler-Natta catalyst using a specific transition metal compound and an organoaluminum compound is described in Japanese Patent Publication No.2623070. Further, an ethylene-styrene copolymer obtained by using a similar catalyst in which the arrangement of phenyl groups is sterically regulated is described in Japanese Patent Publication (Kokai) No.9-309925. Either of these copolymers is excellent in viscoelastic properties and transparency, and is expected as a replacement for polyvinyl chloride. However, there have been problems in that a copolymer with a high styrene composition is particularly insufficient in mechanical strength because the molecular weight of a polymer tends to be deteriorated in accordance with the enhancement of copolymerization composition of styrene. On the other hand, a process for copolymerizing ethylene, styrene and 1,5-hexadiene is described in J. Polym. Sci., Part A: Polym. Chem., Vol.35(1997), p2549. However, there have been problems that the copolymer obtained by this process is insufficient in the transparency and the mechanical strength because a molecular weight distribution (Mw/Mn) represented by a ratio of a weight average molecular weight(Mw) to a number average molecular weight(Mn) is extremely wide as 14.5.

Further, Japanese Patent Publication No.2623070 is known as an ethylene-alkenyl aromatic compound copolymer in which an alkenyl aromatic compound such as styrene or the like is used as a copolymer component of ethylene. However, it is hardly said that the ethylene-styrene copolymer disclosed herein has a comparatively short property relaxation time against a zero-shear melt viscosity which is judged by a melt viscosity $\eta^*(0.1)$ and a reciprocal $\omega c$ of the property relaxation time shown in literature "SPE ANTEC, 1086–1090 (1997)", namely, has a low non-Newtonian property and is sufficiently excellent in processability. None of ethylene-alkenyl aromatic compound copolymer sufficiently excellent in processability has been found, and therefore, the development of such resin has been intensively desired. Further, since a film, a sheet, a molded container and the like obtained. from such resin have an extremely easy processability, its practical application is intensively desired.

SUMMARY OF THE INVENTION

An object of the present invention is to provide an ethylene-mono-alkenyl aromatic compound (herein-after, sometimes referred to simply as "alkenyl aromatic compound") copolymer having an excellent processability.

Another object of the present invention is to provide a copolymer capable of taking a constitution in which a halogen is not contained having a high molecular weight and a narrow molecular weight distribution, and being excellent in an elastic recoverability and a transparency.

Further, another object of the present invention is to provide a process for producing said copolymer at an extremely high polymerization activity.

Still further, another object of the present invention is to provide a molded article comprising said copolymer and being transparent and excellent in a mechanical strength, a flexibility and an elastic recoverability.

Other objects of the present invention will be apparent from the following descriptions.

The present inventors have extensively studied the mechanism of manifesting the processability of an ethylene-alkenyl aromatic compound copolymer for a long time, and as a result, the present inventors have found that an ethylene-alkenyl aromatic compound copolymer having an improved balance between a zero-shear melt viscosity and a property relaxation time which cannot be conventionally found, a process for the production thereof, and a use thereof can attain the objects of the present invention within the range of a melt viscosity and a molecular weight distribution, and have thereby completed the present invention.

According to the present invention, an ethylene-alkenyl aromatic compound copolymer having a melt viscosity $\eta^*_{100}$ at a shear rate of 100 radian/second at 190° C. within a range of $3.0 \times 10^3$ to $3.0 \times 10^6$ poise, a molecular weight distribution in terms of ratio of weight average molecular weight(Mw) to number average molecular weight(Mn) [Mw/Mn] within a range of 1.2 to 4.0, and wherein a zero-shear melt viscosity $\eta^*_0$ (poise) at 190° C. and a characteristic relaxation time $\tau_0$ (second) which satisfy the relation of the expression (1) described below, is provided.

$$\log \tau_0 > \log \eta^*_0 - 6.38 \tag{1}$$

Further, according to the present invention, a process for producing the fore-mentioned ethylene-alkenyl aromatic compound copolymer which is produced in the presence of a catalyst using a specific transition metal compound having a group which has a cyclopentadienyl type anion skeleton, is provided.

Further, according to the present invention, a molded article prepared from the above-mentioned ethylene-alkenyl aromatic compound copolymer, is provided.

DETAILED DESCRIPTION OF THE INVENTION

Figure 1:
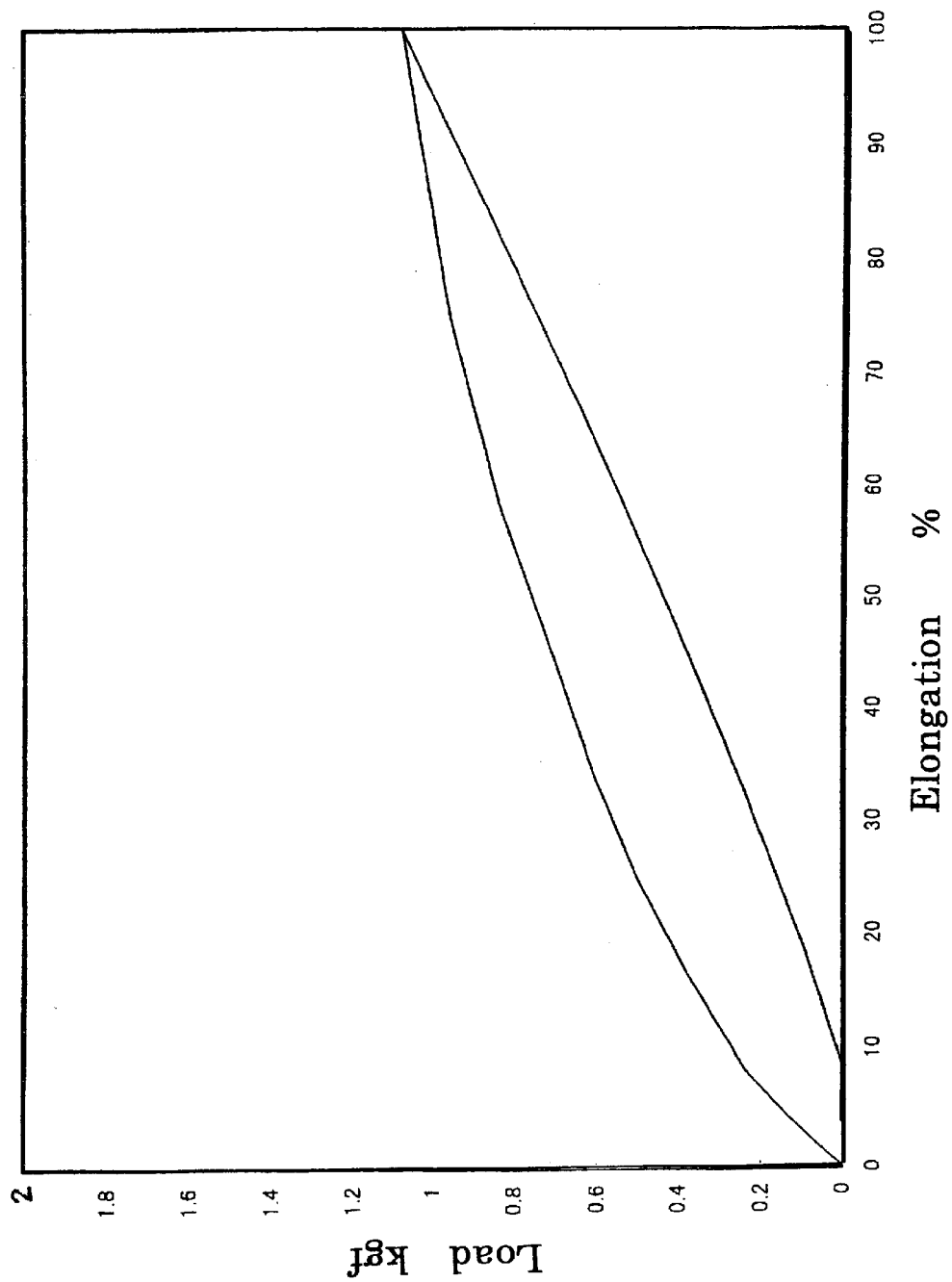
FIG. 1 shows a hysteresis curve of the copolymer obtained in Example 4.

The present invention is further illustrated in detail below.

The ethylene-alkenyl aromatic compound copolymer of the present invention is a copolymer containing ethylene units and alkenyl aromatic compound units polymerized in the copolymer.

The melt viscosity $\eta^*_{100}$ of the ethylene-alkenyl aromatic compound copolymer of the present invention is within a range of $3.0 \times 10^3$ to $3.0 \times 10^6$ poise. Herein, the melt viscosity $\eta^*_{100}$ means a value obtained by measuring under the conditions described below, and can be positioned as an index of extrusion torque during processing.
(1) Equipment: Rheometrics Mechanical Spectrometer RMS-800 manufactured by Rheometrics Co., Ltd.
(2) Geometry: Parallel plate: 25 mm in diameter, plate spacing: 1.5 to :2 mm
(3) Strain: 5%
(4) Shear rate: 100 radian/second
(5) Temperature: 190° C.

The melt viscosity $\eta^*_{100}$ is preferably $6.0 \times 10^3$ to $2.0 \times 10^6$ poises, more preferably $1.0 \times 10^4$ to $1.0 \times 10^6$ poises, and most preferably $3.0 \times 10^4$ to $6.0 \times 10^5$ poises. When the melt viscosity $\eta^*_{100}$ is less than $3.0 \times 10^3$ poises, it is not preferable that the processability is deteriorated because of the deterioration of melt tension, and when it exceeds $3.0 \times 10^6$ poises, it is not preferable that the processability is deteriorated because an extrusion torque is extremely high.

The zero-shear melt viscosity $\eta^*_0$ (poise) at 190° C. and the characteristic relaxation time $\tau_0$ (second) of the ethylene-alkenyl aromatic compound copolymer of the present invention satisfy the relation of the expression (1) described below. Wherein the zero-shear melt viscosity $\eta^*_0$ (poise) at 190° C. and the characteristic relaxation time $\tau_0$ (second) are measured according to the procedure described in literature "SPE ANTEC, 1814 (1994)". It is known that a usual polyethylene satisfies the relation of the expression(5) described below as described in the same literature.

The property relaxation time $\tau_0$ (second) of the ethylene-alkenyl aromatic compound copolymer of the present invention satisfies preferably the expression (2) described below, more preferably the expression (3) described below, and further preferably the expression (4) described below, respectively. It is not preferable that when the characteristic relaxation time $\tau_0$ (second) does not satisfy the expression (1) described below, it is hardly satisfied that the processability is good.

$$\log \tau_0 > \log \eta^*_0 - 6.38 \quad (1)$$

$$\log \tau_0 > \log \eta^*_0 - 6.28 \quad (2)$$

$$\log \tau_0 > \log \eta^*_0 - 6.13 \quad (3)$$

$$\log \tau_0 > \log \eta^*_0 - 5.98 \quad (4)$$

$$\eta^*_0 = 3.65 \times 10^6 \times \tau_0 \quad (5)$$

The molecular weight distribution (Mw/Mn) of the ethylene-alkenyl aromatic compound copolymer of the present invention is 1.2 to 4.0, preferably 1.4 to 3.5, and more preferably 1.6 to 2.6. When the Mw/Mn is less than 1.2, it is not preferable because the processability becomes poor because of the increase of extrusion torque during processing. Further, when the Mw/Mn exceeds 4.0, it is not preferable because it causes the deterioration of mechanical strength. Herein, the Mw/Mn means an average molecular weight ratio(Mw/Mn) in which a polystyrene-reduced weight average molecular weight(Mw) obtained under the conditions described below, is divided by a polystyrene-reduced number average molecular weight(Mn).
(1) Equipment: Waters 150C. manufactured by Waters Co., Ltd.
(2) Column: TOSOH TSKgel GMH-HT
(3) Measurement temperature: 145° C.
(4) Carrier: o-dichlorobenzene
(5) Flow rate: 1.0 mL/min.
(6) Injection amount: 500 $\mu$L The alkenyl aromatic compound used in the present invention is preferably a mono-alkenyl compound having an aromatic hydrocarbon group having 6 to 25 carbon atoms. Specific examples of the aromatic hydrocarbon group having 6 to 25 carbon atoms include a phenyl group, a tolyl group, a xylyl group, a tert-butylphenyl group, a vinylphenyl group, a naphthyl group, a phenanthryl group, an anthrathenyl group and the like. Preferable aromatic hydrocarbon groups are a phenyl group, a tolyl group, a xylyl group, a tert-butylphenyl group and a naphthyl group.

Specific examples of the alkenyl aromatic hydrocarbon include alkylstyrenes such as p-methylstyrene, m-methylstyrene, o-methylstyrene, p-methylstyrene, m-ethylstyrene, o-ethylstyrene, 2,4-dimethylstyrene, 2,5-dimethylstyrene, 3,4-dimethylstyrere, 3,5-dimethylstyrene, 3-methyl-5-ethylstyrene, p-tert-butylstyrene, p-sec-butylstyrene and the like; alkenylbenzenes such as styrene, 2-phenylpropylene, 2-phenylbutene and the like; vinylnaphthalenes such as 1-vinylnaphthalene and the like, etc. The alkenyl aromatic hydrocarbon used in the present invention is preferably styrene, p-methylstyrene, m-methylstyrene, o-methylstyrene, p-tert-butylstyrene, 2-phenylpropylene, or 1-vinylnaphthalene, and styrene is preferable in particular.

In the present invention, the ethylene-mono-alkenyl aromatic compound copolymer includes a binary copolymer of ethylene and a mono-alkenyl aromatic hydrocarbon, and further, a ternary copolymer of ethylene, a mono-alkenyl aromatic hydrocarbon and a diene.

As the diene used in said ternary copolymer, bis-alkenyl aromatic hydrocarbons such as, for example, divinylbenzene, divinylnaphthalene, divinylbiphenyl, diallylbenzene and the like are mentioned. Divinylbenzene or divinylbiphenyl is preferable, and divinylbenzene is particularly preferable.

The above-mentioned ternary copolymer of the present invention has no vinyl group derived from the diene in a molecular chain. The unreacted vinyl group of the diene bonded in the polymer molecular chain is further polymerized with another monomer, and as a result, a polymer having a structure of a branched polymer chain or of mutually crosslinked polymer chains is formed. The polymer having such structure is superior in processsability.

When the diene is copolymerized, the molecular weight distribution tends to be broadened in accordance with the increase of molecular weight caused by crosslinking. When the tendency is remarkable, the improvement effect of mechanical strength is low, and the transparency is deteriorated. However, when a bis-alkenyl aromatic hydrocarbon is used as the diene and a specified catalyst is used, the increase of molecular weight can be promoted without remarkably broadening the molecular weight distribution of a copolymer.

The content of the alkenyl aromatic hydrocarbon unit polymerized in the binary or ternary copolymer of the present invention is 1 to 99 mol %, and in the binary copolymer, more preferably 1 to 20 mol %, and further in the ternary copolymer, more preferably 10 to 60 mol % and most preferably 20 to 60 mol %. When the content of the alkenyl aromatic hydrocarbon unit is within the range, it is preferable because flexibility is good. In case of the binary copolymer, the residues are ethylene units. Further, in case of the ternary copolymer, the preferable content of the diene units in the copolymer of the present invention is 0.00001 to 0.1 mol % in terms of a charge ratio based on the total of ethylene and the alkenyl aromatic hydrocarbon (100 mol %) during polymerization. When the charge ratio of diene units is within the range, the copolymer is particularly superior in mechanical strength. When the charge amount ratio is too low, the improvement of processability can not be confirmed. On the other hand, when the charge ratio of diene units is too high, it is not preferable that the processability of the polymer obtained is adversely deteriorated because the crosslinking degree of the copolymer becomes high. The content of diene units is more preferably 0.0001 to 0.01 mol %, and the content of diene units is further preferably 0.0003 to 0.01 mol %. In case of the ternary copolymer, the remainder are ethylene units.

Further, in the present invention, a small amount of a monomer having one addition-polymerizable unsaturated bond such as an α-olefin or the like may be copolymerized in addition to ethylene and the alkenyl aromatic hydrocarbon, so far as the purpose of the present invention is not damaged. Specific examples of the addition-polymerizable monomer such as an α-olefin or the like include propylene, 1-butene, 1-hexene, 4-methyl-1-pentene, 1-octene, 1-decene, 1-dodecene, 1-tetradecene, 1-hexadecene, vinylcyclohexane, norbornene and the like.

Further, the number average molecular weight (Mn) of the copolymer of the present invention is preferably 50,000 to 1,000,000, more preferably 50,000 to 500,000, and preferably 80,000 to 400,000 in particular from the viewpoint of the mechanical strength.

In the copolymer of the present invention, the sequence of an olefin and an alkenyl aromatic hydrocarbon in the polymer backbone can be determined by a $^{13}$C-NMR spectrum.

Among the copolymers of the present invention, a copolymer wherein the ratio ((②/③)) of an area of a peak ② appearing at 34.0 to 36.0 ppm in a $^{13}$C-NMR spectrum to an area of a peak ③ appearing at 36.0 to 38.0 ppm is 0.01 to 0.25, is preferable, and a copolymer having a ratio of 0.01 to 0.20 is more preferable.

In the $^{13}$C-NMR spectrum, peaks based on a methylene group indicated by Sαγ and Sαδ in the general formula (1) described below appears usually at 36.0 to 38.0 ppm (③). The existence of said methylene group indicates that an alkenyl aromatic hydrocarbon unit is sandwiched by ethylene units in the polymer backbone, and a structure in which there is no sequence of the alkenyl aromatic hydrocarbons, exists. Further, when such bond occurs, carbon atoms substituted with an aromatic hydrocarbon group are mutually separated by 3 methylene groups or more.

Further, a peak based on a methylene group indicated by Sαβ in the general formula (2) described below appears usually at 34.0 to 36.0 ppm (②). Such methylene group exists when the alkenyl aromatic hydrocarbon unit is bonded to an inverse direction in the molecular chains of the copolymer. Namely, said methylene group exists when the insertion form of the alkenyl aromatic hydrocarbon takes 1,2-insertion successively after 2,1-insertion, or takes 2,1-insertion through the insertion of ethylene or a diene after 1,2-insertion. Further, when such bond occurs, carbon atoms substituted with an aromatic hydrocarbon group are mutually separated by 2 methylene groups.

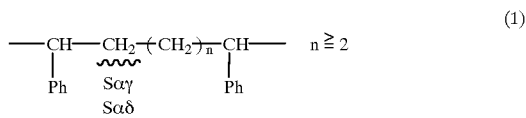

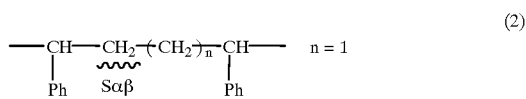

Further, a case in which styrene was used as the alkenyl aromatic hydrocarbon was illustrated in the general formulae (1) and (2), and the presence position of the diene in a polymer backbone is similar as styrene.

The ratio ((②/③)) of an area of a peak ② appearing at 34.0 to 36.0 ppm in a $^{13}$C-NMR spectrum of the copolymer to an area of a peak (③) appearing at 36.0 to 38.0 ppm is 0.01 to 0.25, the copolymer has few ethylene sequences or few sequences of the alkenyl aromatic hydrocarbon, and the alternating property of the insertion of ethylene and the alkenyl aromatic hydrocarbon is high. Therefore, such copolymer has a good balance of viscoelasticity. Herein, the balance of viscoelasticity is a balance between a storage modulus (E') and a loss modulus (E") which are obtained by a dynamic viscoelasticity measurement of a solid, and in general, when the storage modulus lowers, the loss modulus also tends to become low. To the contrary, the copolymer having a high alternating property in the insertion of ethylene and the alkenyl aromatic hydrocarbon has a low storage modulus. Namely, although the copolymer has a flexibility, the loss modulus is high, in other words, a repulsion property is low, and a delay recoverability and a damping property are good.

The copolymer of the present invention is preferably an amorphous copolymer having no crystallinity, from the viewpoint of transparency. It can be confirmed by no substantial indication of a melting point in a melting curve measured by a differential scanning calorimeter (DSC) that the copolymer has no crystallinity.

The ethylene-alkenyl aromatic compound binary copolymer or ethylene-alkenyl aromatic compound-diene ternary copolymer of the present invention is preferably produced in the presence of, for example, a catalyst using a transition metal compound indicated by the general formula [I], [II] or [III] described below. As a copolymer containing no vinyl group derived from a diene is obtained in case of the ethylene-alkenyl aromatic compound-diene terpolymer, these catalysts are preferable in particular.

The copolymer of the present invention can be produced at high polymerization activity, for example, by copolymerizing ethylene with an alkenyl aromatic hydrocarbon, or additionally a diene in the presence of a catalyst prepared from (A) and [(B) and/or (C)] described below:

(A): a transition metal complex represented by the following general formula [I], [II] or [III]:

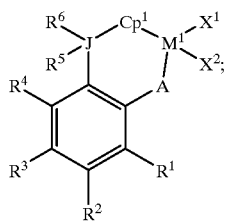

[I]

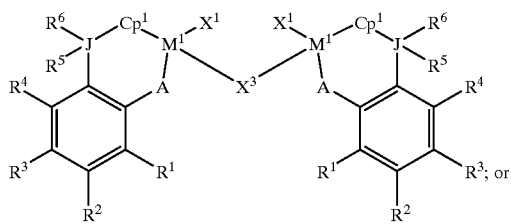

[II]

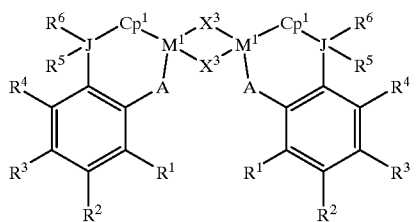

[III]

(wherein $M^1$ indicates a transition metal atom of the Group IV of the Periodic Table of the Elements; A indicates an atom of the Group XVI of the Periodic Table of the Elements; J indicates an atom of the Group XIV of the Periodic Table of the Elements; $Cp^1$ indicates a group having a cyclopentadiene type anion skeleton; each of $X^1$, $X^2$, $R^1$, $R^2$, $R^3$, $R^4$, $R^5$ and $R^6$ independently indicates a hydrogen atom, a halogen atom, an alkyl group, an aralkyl group, an aryl group, a substituted silyl group, an alkoxy group, an aralkyloxy group, an aryloxy group or a di-substituted amino group; $X^3$ indicates an atom of Group XVI of the Periodic Table of the Elements; $R^1$, $R^2$, $R^3$, $R^4$, $R^5$ and $R^6$ may be optionally combined with each other to form a ring; and in the general formula [II] or ]III], two of $M^1$, A, J, $Cp^1$, $X^1$, $X^2$, $X^3$, $R^1$, $R^2$, $R^3$, $R^4$, $R^5$ and $R^6$ may be respectively the same or different.), (B): one or more aluminum compounds selected from the following (B1) to (B3);
(B1) an organoaluminum compound represented by the general formula $E^1{}_a AlZ_{3-a}$,
(B2) a cyclic aluminoxane having a structure represented by the general formula $\{-Al(E^2)-O-\}_b$, and
(B3) a linear aluminoxane having a structure represented by the general formula $E^3\{-Al(E^3)-O-\}_c AlE^3{}_2$
(wherein $E^1$, $E^2$ and $E^3$ respectively represent a hydrocarbon group, all of $E^1$, all of $E^2$ and all of $E^3$ may be the same or different; Z represents a hydrogen atom or a halogen atom, and all of Z may be the same or different; "a" represents a number satisfying the expression $0<a \leq 3$; "b" represents an integer of 2 or more and "c" represents an integer of 1 or more); and (C): a boron compound of any one of the following (C1) to (C3);
(C1) a boron compound represented by the general formula $BQ^1Q^2Q^3$,
(C2) a boron compound represented by the general formula $G^+(BQ^1Q^2Q^3Q^4)^-$, and
(C3) a boron compound represented by the general formula $(L-H)^+(BQ^1Q^2Q^3Q^4)^-$ (wherein B represents a boron atom in the trivalent valence state; $Q^1$ to $Q^4$ may be the same or different and respectively represent a halogen atom, a hydrocarbon group, a halogenated hydrocarbon group, a substituted silyl group, an alkoxy group or a di-substituted amino group; $G^+$ represents an inorganic or organic cation; L represents a neutral Lewis base; and $(L-H)^+$ represents a Brønsted acid).

The production of the copolymer above is described in detail below.

(A) Transition Metal Complex

In the general formula [I], [II] or [III], the transition metal atom represented by $M^1$ means a transition metal element of Group IV of the Periodic Table of the Elements (IUPAC Inorganic Chemistry Nomenclature, Revised Edition, 1989), and examples thereof include a titanium atom, zirconium atom, hafnium atom, etc. Among them, a titanium atom or zirconium atom is preferred.

Examples of an atom of the XVI Group indicated as A in the general formula [I]; [II] or [III], include an oxygen atom, sulfur atom, selenium atom and the like. Among them, an oxygen atom is preferred.

Examples of an atom of the XIV Group indicated as J in the general formula [I], [II] or [III],include a carbon atom, silicon atom, germanium atom and the like, a carbon atom and silicon atom are preferred, and a carbon atom is particularly preferred.

The group having a cyclopentadiene type anion skeleton, as for the substituent $Cp^1$, includes $\eta^5$-(substituted) cyclopentadienyl group, $\eta^5$-(substituted)indenyl group, $\eta^5$-(substituted)fluorenyl group, etc. Specific examples thereof include $\eta^5$-cyclopentadienyl group, $\eta^5$-methylcyclopentadienyl group, $\eta^5$-dimethylcyclopentadienyl group, $\eta^5$-trimethylcyclopentadienyl group, $\eta^5$-tetramethylcyclopentadienyl group, $\eta^5$-ethylcyclopentadienyl group, $\eta^5$-n-propylcyclopentadienyl group, $\eta^5$-isopropylcyclopentadienyl group, $\eta^5$-n-butylcyclopentadienyl group, $\eta^5$-sec-butylcyclopentadienyl group, $\eta^5$-tert-butylcyclopentadienyl group, $\eta^5$-n-pentylcyclopentadienyl group, $\eta^5$-neopentylcyclopentadienyl group, $\eta^5$-n-hexylcyclopentadienyl group, $\eta^5$-n-octylcyclopentadienyl group, $\eta^5$-phenylcyclopentadienyl group, $\eta^5$-naphthylcyclopentadienyl group, $\eta^5$-trimethylsilylcyclopentadienyl group, $\eta^5$-triethylsilylcyclopentadienyl group, $\eta^5$-tert-butyldimethylsilylcyclopentadienyl group, $\eta^5$-indenyl group, $\eta^5$-methylindenyl group, $\eta^5$-dimethylindenyl group, $\eta^5$-ethylindenyl group, $\eta^5$-n-propylindenyl group, $\eta^5$-isopropylindenyl group, $\eta^5$-n-butylindenyl group, $\eta^5$-sec-butylindenyl group, $\eta^5$-tert-butylindenyl group, $\eta^5$-n-pentylindenyl group, $\eta^5$-neopentylindenyl group, $\eta^5$-n-hexylindenyl group, $\eta^5$-n-octylindenyl group, $\eta^5$-n-decylindenyl group, $\eta^5$-phenylindenyl group, $\eta^5$-methylphenylindenyl group, $\eta^5$-naphthylindenyl group, $\eta^5$-trimethylsilylindenyl group, $\eta^5$-triethylsilylindenyl group, $\eta^5$-tert-butyldimethylsilylindenyl group, $\eta^5$-tetrahydroindenyl group, $\eta^5$-fluorenyl group, $\eta^5$-methylfluorenyl group, $\eta^5$-dimethylfluorenyl group, $\eta^5$-ethylfluorenyl group, $\eta^5$-diethylfluorenyl group, $\eta^5$-n-propylfluorenyl group, $\eta^5$-di-n-propylfluorenyl group, $\eta^5$-isopropylfluorenyl group, $\eta^5$-diisopropylfluorenyl group, $\eta^5$-n-butylfluorenyl group, $\eta^5$-sec-butylfluorenyl group, $\eta^5$-tert-butylfluorenyl group, $\eta^5$-di-n-butylfluorenyl group, $\eta^5$-di-sec-butylfluorenyl group, $\eta^5$-di-tert-butylfluorenyl group, $\eta^5$-n-pentylfluorenyl group, $\eta^5$-neopentylfluorenyl group, $\eta^5$-n-hexylfluorenyl group, $\eta^5$-n-octylfluorenyl group, $\eta^5$-n-decylfluorenyl group, $\eta^5$-n-dodecylfluorenyl group, $\eta^5$-phenylfluorenyl group, $\eta^5$-diphenylfluorenyl group, $\eta^5$-methylphenylfluorenyl group, $\eta^5$-naphthylfluorenyl group, $\eta^5$-trimethylsilylfluorenyl group, $\eta^5$-bis-trimethylsilylfluorenyl group, $\eta^5$-triethylsilylfluorenyl group, $\eta^5$-tert-butyldimethylsilylfluorenyl group, etc. Among them, an $\eta^5$-cyclopentadienyl group, $\eta^5$-methylcyclopentadienyl group, $\eta^5$-tert-butylcyclopentadienyl group, $\eta^5$-tetramethylcyclopentadienyl group, $\eta^5$-indenyl group and $\eta^5$-fluorenyl group are particularly preferred.

Examples of the halogen atom in the substituent $X^1$, $X^2$, $R^1$, $R^2$, $R^3$, $R^4$, $R^5$ or $R^6$ include fluorine atom, chlorine atom, bromine atom and iodine atom, preferably chlorine atom or bromine atom, more preferably chlorine atom.

As the alkyl group in the substituent $X^1$, $X^2$, $R^1$, $R^2$, $R^3$, $R^4$, $R^5$ or $R^6$, an alkyl group having 1 to 20 carbon atoms is preferred. Examples thereof include methyl group, ethyl group, n-propyl group, isopropyl group, n-butyl group, sec-butyl group, tert-butyl group, n-pentyl group, neopentyl group, sec-amyl group, n-hexyl group, n-octyl group, n-decyl group, n-dodecyl group, n-pentadecyl group, n-eicosyl group, etc., more preferably a methyl group, ethyl group, isopropyl group, tert-butyl group or sec-amyl group.

All of these alkyl groups may be substituted with a halogen atom (fluorine atom, chlorine atom, bromine atom or iodine atom). Examples of the alkyl group having 1 to 20 carbon atoms, which is substituted with the halogen atom, include fluoromethyl group, difluoromethyl group, trifluoromethyl group, chloromethyl group, dichloromethyl group, trichloromethyl group, bromomethyl group, dibromomethyl group, tribromomethyl group, iodomethyl group, diiodomethyl group, triiodomethyl group, fluoroethyl group, difluoroethyl group, trifluoroethyl group, tetrafluoroethyl group, pentafluoroethyl group, chloroethyl group, dichloroethyl group, trichloroethyl group, tetrachloroethyl group, pentachloroethyl group, bromoethyl group, dibromoethyl group, tribromoethyl group, tetrabromoethyl group, pentabromoethyl group, perfluoropropyl group, perfluorobutyl group, perfluoropentyl group, perfluorohexyl group, perfluorooctyl group, perfluorododecyl group, perfluoropentadecyl group, perfluoroeicosyl group, perchloropropyl group, perchlorobutyl group, perchloropentyl group, perchlorohexyl group, perchlorooctyl group, perchlorododecyl group, perchloropentadecyl group, perchloroeicosyl group, perbromopropyl group, perbromobutyl group, perbromopentyl group, perbromohexyl group, perbromooctyl group, perbromododecyl group, perbromopentadecyl group, perbromoeicosyl group, etc.

All of these alkyl groups may be partially substituted with an alkoxy group such as methoxy group, ethoxy group, etc., an aryloxy group such as phenoxy group, etc. or an aralkyloxy group such as benzyloxy group, etc.

As the aralkyl group in the substituent $X^1$, $X^2$, $R^1$, $R^2$, $R^3$, $R^4$, $R^5$ or $R^6$, an aralkyl group having 7 to 20 carbon atoms is preferred. Examples thereof include benzyl group, (2-methylphenyl)methyl group, (3-methylphenyl)methyl group, (4-methylphenyl)methyl group, (2,3-dimethylphenyl)methyl group, (2,4-dimethylphenyl)methyl group, (2,5-dimethylphenyl)methyl group, (2,6-dimethylphenyl)methyl group, (3,4-dimethylphenyl)methyl group, (3,5-dimethylphenyl)methyl group, (4,6-dimethylphenyl)methyl group, (2,3,4-timethylphenyl)methyl group, (2,3,5-timethylphenyl)methyl group, (2,3,6-timethylphenyl)methyl group, (3,4,5-timethylphenyl)methyl group, (2,4,6-timethylphenyl)methyl group, (2,3,4,5-tetramethylphenyl)methyl group, (2,3,4,6-tetramethylphenyl)methyl group, (2,3,5,6-tetramethylphenyl)methyl group, (pentamethylphenyl)methyl group, (ethylphenyl)methyl group, (n-propylphenyl)methyl group, (isopropylphenyl)methyl group, (n-butylphenyl)methyl group, (sec-butylphenyl)methyl group, (tert-butylphenyl)methyl group, (n-pentylphenyl)methyl group, (neopentylphenyl)methyl group, (n-hexylphenyl)methyl group, (n-octylphenyl)methyl group, (n-decylphenyl)methyl group, (n-dodecylphenyl)methyl group, (n-tetradecylphenyl)methyl group, naphthylmethyl group, anthracenylmethyl group, etc., more preferably a benzyl group.

All of these aralkyl groups may be partially substituted with a halogen atom (fluorine atom, chlorine atom, bromine atom or iodine atom), an alkoxy group such as methoxy group, ethoxy group, etc., an aryloxy group such as phenoxy group, etc., or an aralkyloxy group such as benzyloxy group, etc.

As the aryl group in the substituent $X^1$, $X^2$, $R^1$, $R^2$, $R^3$, $R^4$, $R^5$ or $R^6$, an aryl group having 6 to 20 carbon atoms is preferred. Examples thereof include phenyl group, 2-tolyl group, 3-tolyl group, 4-tolyl group, 2,3-xylyl group, 2,4-xylyl group, 2,5-xylyl group, 2,6-xylyl group, 3,4-xylyl group, 3,5-xylyl group, 2,3,4-trimethylphenyl group, 2,3,5-trimethylphenyl group, 2,3,6-trimethylphenyl group, 2,4,6-trimethylphenyl group, 3,4,5-trimethylphenyl group, 2,3,4,5-tetramethylphenyl group, 2,3,4,6-tetramethylphenyl group, 2,3,5,6-tetramethylphenyl group, pentamethylphenyl group, ethylphenyl group, n-propylphenyl group, isopropylphenyl group, n-butylphenyl group, sec-butylphenyl group, tert-butylphenyl group, n-pentylphenyl group, neopentylphenyl group, n-hexylphenyl group, n-octylphenyl group, n-decylphenyl group, n-dodecylphenyl group, n-tetradecylphenyl group, naphthyl group, anthracenyl group, etc., more preferably phenyl group.

All of these aryl groups may be partially substituted with a halogen atom (fluorine atom, chlorine atom, bromine atom or iodine atom), an alkoxy group such as methoxy group, ethoxy group, etc., an aryloxy group such as phenoxy group, etc., or an aralkyloxy group such as benzyloxy group, etc.

The substituted silyl group in the substituent $X^1$, $X^2$, $R^1$, $R^2$, $R^3$, $R^4$, $R^5$ or $R^6$ is a silyl group substituted with a hydrocarbon group, and examples of the hydrocarbon group include an alkyl group having 1 to 10 carbon atoms, such as methyl group, ethyl group, n-propyl group, isopropyl group, n-butyl group, sec-butyl group, tert-butyl group, isobutyl group, n-pentyl group, n-hexyl group, cyclohexyl group, etc., and an aryl group such as phenyl group. Examples of the substituted silyl group having 1 to 20 carbon atoms include mono-substituted silyl groups having 1 to 20 carbon atoms, such as methylsilyl group, ethylsilyl group, phenylsilyl group, etc.; di-substituted silyl groups having 2 to 20 carbon atoms, such as dimethylsilyl group, diethylsilyl group, diphenylsilyl group, etc.; and tri-substituted silyl groups having 3 to 20 carbon atoms, such as trimethylsilyl group, triethylsilyl group, tri-n-propylsilyl group, triisopropylsilyl group, tri-n-butylsilyl group, tri-sec-butylsilyl group, tri-tert-butylsilyl group, tri-isobutylsilyl group, tert-butyl-dimethylsilyl group, tri-n-pentylsilyl group, tri-n-hexylsilyl group, tricyclohexylsilyl group, triphenylsilyl group, etc., preferably trimethylsilyl group, tert-butyldimethylsilyl group or triphenylsilyl group.

All of the hydrocarbon groups of these substituted silyl groups may be partially substituted with a halogen atom (fluorine atom, chlorine atom, bromine atom or iodine atom), an alkoxy group such as methoxy group, ethoxy group, etc., an aryloxy group such as phenoxy group, etc., or an aralkyloxy group such as benzyloxy group, etc.

As the alkoxy group in the substituent $X^1$, $X^2$, $R^1$, $R^2$, $R^3$, $R^4$, $R^5$ or $R^6$, an alkoxy group having 1 to 20 carbon atoms is preferred. Examples thereof include methoxy group, ethoxy group, n-propoxy group, isopropoxy group, n-butoxy group, sec-butoxy group, tert-butoxy group, n-pentoxy group, neopentoxy group, n-hexoxy group, n-octoxy group, n-dodecoxy group, n-pentadecoxy group, n-eicosoxy group, etc., more preferably methoxy group, ethoxy group or tert-butoxy group.

All of these alkoxy groups may be partially substituted with a halogen atom (fluorine atom, chlorine atom, bromine atom or iodine atom), an alkoxy group such as methoxy group, ethoxy group, etc., an aryloxy group such as phenoxy group, etc., or an aralkyloxy group such as benzyloxy group, etc.

As the aralkyloxy group in the substituent $X^1$, $X^2$, $R^1$, $R^2$, $R^3$, $R^4$, $R^5$ or $R^6$, an aralkyloxy group having 7 to 20 carbon atoms is preferred. Examples thereof include benzyloxy group, (2-methylphenyl)methoxy group, (3-methylphenyl)methoxy group, (4-methylphenyl)methoxy group, (2,3-dimethylphenyl)methoxy group, (2,4-dimethylphenyl)methoxy group, (2,5-dimethylphenyl)methoxy group, (2,6-dimethylphenyl)methoxy group, (3,4-dimethylphenyl)methoxy group, (3,5-dimethylphenyl)methoxy group, (2,3,4-trimethylphenyl)methoxy group, (2,3,5-trimethylphenyl)methoxy group, (2,3,6-trimethylphenyl)methoxy group, (2,4,5-trimethylphenyl)methoxy group, (2,4,6-trimethylphenyl)methoxy group, (3,4,5-trimethylphenyl)methoxy group, (2,3,4,5-tetramethylphenyl)methoxy group, (2,3,4,6-tetramethylphenyl)methoxy group, (2,3,5,6-tetramethylphenyl)methoxy group, (pentamethylphenyl)methoxy group, (ethylphenyl)methoxy group, (n-propylphenyl)methoxy group, (isopropylphenyl)methoxy group, (n-butylphenyl)methoxy group, (sec-butylphenyl)methoxy group, (tert-butylphenyl)methoxy group, (n-hexylphenyl)methoxy group, (n-octylphenyl)methoxy group, (n-decylphenyl)methoxy group, (n-tetradecylphenyl)methoxy group, naphthylmethoxy group, anthracenyl-methoxy group, etc., more preferably benzyloxy group.

All of these aralkyloxy groups may be partially substituted with a halogen atom (fluorine atom, chlorine atom, bromine atom or iodine atom), an alkoxy group such as methoxy group, ethoxy group, etc., an aryloxy group su.ch as phenoxy group, etc., or an aralkyloxy group such as benzyloxy group, etc.

As the aryloxy group in the substituent $X^1$, $X^2$, $R^1$, $R^2$, $R^3$, $R^4$, $R^5$ or $R^6$, an aralkyloxy group having 6 to 20 carbon atoms is preferred. Examples thereof include phenoxy group, 2-methylphenoxy group, 3-methylphenoxy group, 4-methylphenoxy group, 2,3-dimethylphenoxy group, 2,4-dimethylphenoxy group, 2,5-dimethylphenoxy group, 2,6-dimethylphenoxy group, 3,4-dimethylphenoxy group, 3,5-dimethylphenoxy group, 2,3,4-trimethylphenoxy group, 2,3,5-trimethylphenoxy group, 2,3,6-trimethylphenoxy group, 2,4,5-trimethylphenoxy group, 2,4,6-trimethylphenoxy group, 3,4,5-trimethylphenoxy group, 2,3,4,5-tetramethylphenoxy group, 2,3,4,6-tetramethylphenoxy group, 2,3,5,6-tetramethylphenoxy group, pentamethylphenoxy group, ethylphenoxy group, n-propylphenoxy group, isopropylphenoxy group, n-butylphenoxy group, sec-butylphenoxy group, tert-butylphenoxy group, n-hexylphenoxy group, n-octylphenoxy group, n-decylphenoxy group, n-tetradecylphenoxy group, naphthoxy group, anthracenoxy group, etc.

All of these aryloxy groups may be partially substituted with a halogen atom (fluorine atom, chlorine atom, bromine atom or iodine atom), an alkoxy group such as methoxy group, ethoxy group, etc., an aryloxy group such as phenoxy group, etc., or an aralkyloxy group such as benzyloxy group, etc.

The di-substituted amino group in the substituent $X^1$, $X^2$, $R^1$, $R^2$, $R^3$, $R^4$, $R^5$ or $R^6$ is an amino group substituted with two hydrocarbon groups, and examples of the hydrocarbon group include an alkyl group having 1 to 10 carbon atoms, such as methyl group, ethyl group, n-propyl group, isopropyl group, n-butyl group, sec-butyl group, tert-butyl group, isobutyl group, n-pentyl group, n-hexyl group, cyclohexyl group, etc., an aryl group having 6 to 10 carbon atoms, such as phenyl group, etc., and an aralkyl group having 7 to 10 carbon atoms. Examples of the di-substituted amino group substituted with the hydrocarbon group having 1 to 10 carbon atoms include dimethylamino group, diethylamino group, di-n-propylamino group, diisopropylamino group, di-n-butylamino group, di-sec-butylamino group, di-tert-butylamino group, di-isobutylamino group, tert-butylisopropylamino group, di-n-hexylamino group, di-n-octylamino group, di-n-decylamino group, diphenylamino group, bistrimethylsilylamino group, bis-tert-butyldimethylsilylamino group, etc., preferably dimethylamino group or diethylamino group.

The substituent $R^1$, $R^2$, $R^3$, $R^4$, $R^5$ and $R^6$ may be optionally combined with each other to form a ring.

$R^1$ is preferably an alkyl group, an aralkyl group, an aryl group or a substituted silyl group.

Preferably, each of $X^1$ and $X^2$ is independently a halogen atom, an alkyl group, an aralkyl group, an alkoxy group, an aryloxy group or a di-substituted amino group, more preferably halogen atom.

Examples of the atom of Group XVI of the Periodic Table of the Elements indicated as $X^3$ in the general formula [II] or [III] include an oxygen atom, a sulfur atom, a selenium atom and the like, and an oxygen atom is preferable.

Examples of the transition metal complex (A) represented by the formula [I] (hereinafter referred to as a "transition metal complex A", sometimes) include transition metal complexes wherein J is a carbon atom in the general formula [I], such as methylene(cyclopentadienyl)(3,5-dimethyl-2-phenoxy)titanium dichloride, methylene(cyclopentadienyl)(3-tert-butyl-2-phenoxy)titanium dichloride, methylene(cyclopentadienyl)(3-tert-butyl-5-methyl-2-phenoxy)titanium dichloride, methylene(cyclopentadienyl)(3-phenyl-2-phenoxy)titanium dichloride, methylene(cyclopentadienyl)(3-tert-butyldimethylsilyl-5-methyl-2-phenoxy)titanium dichloride, methylene(cyclopentadienyl)(3-trimethylsilyl-5-methyl-2-phenoxy)titanium dichloride, methylene(cyclopentadienyl)(3-tert-butyl-5-methoxy-2-phenoxy)titanium dichloride, methylene(cyclopentadienyl)(3-tert-butyl-5-chloro-2-phenoxy)titanium dichloride, methylene(methylcyclopentadienyl)(3,5-dimethyl-2-phenoxy)titanium dichloride, methylene(methylcyclopentadienyl)(3-tert-butyl-2-phenoxy)titanium dichloride, methylene(methylcyclopentadienyl)(3-tertbutyl-5-methyl-2-phenoxy)titanium dichloride, methylene(methylcyclopentadienyl)(3-phenyl-2-phenoxy)titanium dichloride, methylene(methylcyclopentadienyl)(3-1-tert-butyldimethylsilyl-5-methyl-2-phenoxy)titanium dichloride, methylene(methylcyclopentadienyl)(3-trimethylsilyl-5-methyl-2-phenoxy)titanium dichloride, methylene(methylcyclopentadienyl)(3-tert-butyl-5-methoxy-2-phenoxy)titanium dichloride, methylene(methylcyclopentadienyl)(3-tert-butyl-5-chloro-2-phenoxy)titanium dichloride, methylene(tert-butylcyclopentadienyl)(3,5-dimethyl-2-phenoxy)titanium dichloride, methylene(tert-butylcyclopentadienyl)(3-tert-butyl-2-phenoxy)titanium dichloride, methylene(tert-butylcyclopentadienyl)(3-tert-butyl-5-methyl-2-phenoxy)titanium dichloride, methylene(tert-butylcyclopentadienyl)(3-phenyl-2-phenoxy)titanium dichloride, methylene(tert-butylcyclopentadienyl)(3-tert-butyldimethylsilyl-5-methyl-2-phenoxy)titanium dichloride, methylene(tert-butylcyclopentadienyl)(3-trimethylsilyl-5-methyl-2-phenoxy)titanium dichloride, methylene(tert-butylcyclopentadienyl)(3-tert-butyl-5-methoxy-2-phenoxy)titanium dichloride, methylene(tert-butylcyclopentadienyl)(3-tert-butyl-5-chloro-2-phenoxy)titanium dichloride, methylene(tetramethylcyclopentadienyl)(3,5-dimethyl-2-phenoxy)titanium dichloride, methylene(tetramethylcyclopentadienyl)(3-tert-butyl-2-phenoxy)titanium dichloride, methylene(tetramethylcyclopentadienyl)(3-tert-butyl-5-methyl-2-phenoxy)titanium dichloride, methylene(tetramethylcyclopentadienyl)(3-phenyl-2-phenoxy)titanium dichloride, methylene(tetramethylcyclopentadienyl)(3-tert-butyldimethylsilyl-5-methyl-2-phenoxy)titanium dichloride, methylene(tetramethylcyclopentadienyl)(3-trimethylsilyl-5-methyl-2-phenoxy)titanium dichloride, methylene(tetramethylcyclopentadienyl)(3-tert-butyl-5-methoxy-2-phenoxy)titanium dichloride, methylene(tetramethylcyclopentadienyl)(3-tert-butyl-5-chloro-2-phenoxy)titanium dichloride, methylene(trimethylsilylcyclopentadienyl)(3,5-dimethyl-2-phenoxy)titanium dichloride, methylene(trimethylsilylcyclopentadienyl)(3-tert-butyl-2-phenoxy)titanium dichloride, methylene(trimethylsilylcyclopentadienyl)(3-tert-butyl-5-methyl-2-phenoxy)titanium dichloride, methylene(trimethylsilylcyclopentadienyl)(3-phenyl-2-phenoxy)titanium dichloride, methylene(trimethylsilylcyclopentadienyl)(3-tert-butyldimethylsilyl-5-methyl-2-phenoxy)titanium dichloride, methylene(trimethylsilylcyclopentadienyl)(3-trimethylsilyl-5-methyl-2-phenoxy)titanium dichloride, methylene(trimethylsilylcyclopentadienyl)(3-tert-butyl-5-methoxy-2-phenoxy)titanium dichloride, methylene(trimethylsilylcyclopentadienyl)(3-tert-butyl-5-chloro-2-phenoxy)titanium dichloride, methylene(fluorenyl)(3,5-dimethyl-2-phenoxy)titanium dichloride, methylene(fluorenyl)(3-tert-butyl-2-phenoxy)titanium dichloride, methylene(fluorenyl)(3-tert-butyl-5-methyl-2-phenoxy)titanium dichloride, methylene(fluorenyl)(3-phenyl-2-phenoxy)titanium dichloride, methylene(fluorenyl)(3-tert-butyldimethylsilyl-5-methyl-2-phenoxy)titanium dichloride, methylene(fluorenyl)(3-trimethylsilyl-5-methyl-2-phenoxy)titanium dichloride, methylene(fluorenyl)(3-tert-butyl-5-methoxy-2-phenoxy)titanium dichloride, methylene(fluorenyl)(3-tert-butyl-5-chloro-2-phenoxy)titanium dichloride, isopropylidene(cyclopentadienyl)(3,5-dimethyl-2-phenoxy)titanium dichloride, isopropylidene(cyclopentadienyl)(3-tert-butyl-2-phenoxy)titanium dichloride, isopropylidene(cyclopentadienyl)(3-tert-butyl-5-methyl-2-phenoxy)titanium dichloride, isopropylidene(cyclopentadienyl)(3-phenyl-2-phenoxy)titanium dichloride, isopropylidene(cyclopentadienyl)(3-tert-butyldimethylsilyl-5-methyl-2-phenoxy)titanium dichloride, isopropylidene(cyclopentadienyl)(3-trimethylsilyl-5-methyl-2-phenoxy)titanium dichloride, isopropylidene(cyclopentadienyl)(3-tert-butyl-5-methoxy-2-phenoxy)titanium dichloride, isopropylidene(cyclopentadienyl)(3-tert-butyl-5-chloro-2-phenoxy)titanium dichloride, isopropylidene(methylcyclopentadienyl)(3,5-dimethyl-2-phenoxy)titanium dichloride, isopropylidene(methylcyclopentadienyl)(3-tert-butyl-2-phenoxy)titanium dichloride, isopropylidene(methylcyclopentadienyl)(3-tert-butyl-5-methyl-2-phenoxy)titanium dichloride, isopropylidene(methylcyclopentadienyl)(3-phenyl-2-phenoxy)titanium dichloride, isopropylidene(methylcyclopentadienyl)(3-tert-butyldimethylsilyl-5-methyl-2-phenoxy)titanium dichloride, isopropylidene(methylcyclopentadienyl)(3-trimethylsilyl-5-methyl-2-phenoxy)titanium dichloride, isopropylidene(methylcyclopentadienyl)(3-tert-butyl-5-methoxy-2-phenoxy)titanium dichloride, isopropylidene(methylcyclopentadienyl)(3-tert-butyl-5-chloro-2-phenoxy)titanium dichloride, isopropylidene(tert-butylcyclopentadienyl)(3,5-dimethyl-2-phenoxy)titanium dichloride, isopropylidene(tert-butylcyclopentadienyl)(3-tert-butyl-2-phenoxy)titanium dichloride, isopropylidene(tert-butylcyclopentadienyl)(3-tert-butyl-5-methyl-2-phenoxy)titanium dichloride, isopropylidene(tert-butylcyclopentadienyl)(3-phenyl-2-phenoxy)titanium dichloride, isopropylidene(tert-butylcyclopentadienyl)(3-tert-butyldimethylsilyl-5-methyl-2-phenoxy)titanium dichloride, isopropylidene(tert-butylcyclopentadienyl)(3-trimethylsilyl-5-methyl-2-phenoxy)titanium dichloride, isopropylidene(tert-butylcyclopentadienyl)(3-tert-butyl-5-methoxy-2-phenoxy)titanium dichloride, isopropylidene(tert-butylcyclopentadienyl)(3-tert-butyl-5-chloro-2-phenoxy)titanium dichloride, isopropylidene(tetramethylcyclopentadienyl)(3,5-dimethyl-2-phenoxy)titanium dichloride, isopropylidene(tetramethylcyclopentadienyl)(3-tert-butyl-2-phenoxy)titanium dichloride, isopropylidene(tetramethylcyclopentadienyl)(3-tert-butyl-5-methyl-2-phenoxy)titanium dichloride, isopropylidene(tetramethylcyclopentadienyl)(3-phenyl-2-phenoxy)titanium dichloride, isopropylidene(tetramethylcyclopentadienyl)(3-tert-butyldimethylsilyl-5-methyl-2-phenoxy)titanium dichloride, isopropylidene(tetramethylcyclopentadienyl)(3-trimethylsilyl-5-methyl-2-phenoxy)titanium dichloride, isopropylidene(tetramethylcyclopentadienyl)(3-tert-butyl-5-methoxy-2-phenoxy)titanium dichloride, isopropylidene(tetramethylcyclopentadienyl)(3-tert-butyl-5-chloro-2-phenoxy)titanium dichloride, isopropylidene(trimethylsilylcyclopentadienyl)(3,5-dimethyl-2-phenoxy)titanium dichloride, isopropylidene(trimethylsilylcyclopentadienyl)(3-tert-butyl-2-phenoxy)titanium dichloride, isopropylidene(trimethylsilylcyclopentadienyl)(3-tert-butyl-5-methyl-2-phenoxy)titanium dichloride, isopropylidene(trimethylsilylcyclopentadienyl)(3-phenyl-2-phenoxy)titanium dichloride, isopropylidene(trimethylsilylcyclopentadienyl)(3-tert-butyldimethylsilyl-5-methyl-2-phenoxy)titanium dichloride, isopropylidene (trimethylsilylcyclopentadienyl)(3-trimethylsilyl-5-methyl-2-phenoxy)titanium dichloride, isopropylidene(trimethylsilylcyclopentadienyl)(3-tert-butyl-5-methoxy-2-phenoxy)titanium dichloride, isopropylidene(trimethylsilylcyclopentadienyl)(3-tert-butyl-5-chloro-2-phenoxy)titanium dichloride, isopropylidene(fluorenyl)(3,5-dimethyl-2-phenoxy)titanium dichloride, isopropylidene(fluorenyl)(3-tert-butyl-2-phenoxy)titanium dichloride, isopropylidene(fluorenyl)(3-tert-butyl-5-methyl-2-phenoxy)titanium dichloride, isopropylidene(fluorenyl)(3-phenyl-2-phenoxy)titanium dichloride, isopropylidene(fluorenyl)(3-tert-butyldimethylsilyl-5-methyl-2-phenoxy)titanium dichloride, isopropylidene(fluorenyl)(3-trimethylsilyl-5-methyl-2-phenoxy)titanium dichloride, isopropylidene(fluorenyl)(3-tert-butyl-5-methoxy-2-phenoxy)titanium dichloride, isopropylidene(fluorenyl)(3-tert-butyl-5-chloro-2-phenoxy)titanium dichloride, diphenylmethylene(cyclopentadienyl)(3,5-dimethyl-2-phenoxy)titanium dichloride, diphenylmethylene(cyclopentadienyl)(3-tert-butyl-2-phenoxy)titanium dichloride, diphenylmethylene(cyclopentadienyl)(3-tert-butyl-5-methyl-2-phenoxy)titanium dichloride, diphenylmethylene(cyclopentadienyl)(3-phenyl-2-phenoxy)titanium dichloride, diphenylmethylene(cyclopentadienyl)(3-tert-butyldimethylsilyl-5-methyl-2-phenoxy)titanium dichloride, diphenylmethylene(cyclopentadienyl)(3-trimethylsilyl-5-methyl-2-phenoxy)titanium dichloride, diphenylmethylene(cyclopentadienyl)(3-tert-butyl-5-methoxy-2-phenoxy)titanium dichloride, diphenylmethylene(cyclopentadienyl)(3-tert-butyl-5-chloro-2-phenoxy)titanium dichloride, diphenylmethylene(methylcyclopentadienyl)(3,5-dimethyl-2-phenoxy)titanium dichloride, diphenylmethylene(methylcyclopentadienyl)(3-tert-butyl-2-phenoxy)titanium dichloride, diphenylmethylene(methylcyclopentadienyl)(3-tert-butyl-5-methyl-2-phenoxy)titanium dichloride, diphenylmethylene(methylcyclopentadienyl)(3-phenyl-2-phenoxy)titanium dichloride, diphenylmethylene(methylcyclopentadienyl)(3-tert-butyldimethylsilyl-5-methyl-2-phenoxy)titanium dichloride, diphenylmethylene(methylcyclopentadienyl)(3-trimethylsilyl-5-methyl-2-phenoxy)titanium dichloride, diphenylmethylene(methylcyclopentadienyl)(3-tert-butyl-5-methoxy-2-phenoxy)titanium dichloride, diphenylmethylene(methylcyclopentadienyl)(3-tert-butyl-5-chloro-2-phenoxy)titanium dichloride, diphenylmethylene(tert-butylcyclopentadienyl)(3,5-dimethyl-2-phenoxy)titanium dichloride, diphenylmethylene(tert-butylcyclopentadienyl)(3-tert-butyl-2-phenoxy)titanium dichloride, diphenylmethylene(tert-butylcyclopenladienyl)(3-tert-butyl-5-methyl-2-phenoxy)titanium dichloride, diphenylmethylene(tert-butylcyclopentadienyl)(3-phenyl-2-phenoxy)titanium dichloride, diphenylmethylene(tert-butylcyclopentadienyl)(3-tert-butyldimethylsilyl-5-methyl-2-phenoxy)titanium dichloride, diphenylmethylene(tert-butylcyclopentadienyl)(3-trimethylsilyl-5-methyl-2-phenoxy)titanium dichloride, diphenylmethylene(tert-butylcyclopentadienyl)(3-tert-butyl-5-methoxy-2-phenoxy)titanium dichloride, diphenylmethylene(tert-butylcyclopentadienyl)(3-tert-butyl-5-chloro-2-phenoxy)titanium dichloride, diphenylmethylene(tetramethylcyclopentadienyl)(3,5-dimethyl-2-phenoxy)titanium dichloride, diphenylmethylene(tetramethylcyclopentadienyl)(3-tert-butyl-2-phenoxy)titanium dichloride, diphenylmethylene(tetramethylcyclopentadienyl)(3-tert-butyl-5-methyl-2-phenoxy)titanium dichloride, diphenylmethylene(tetramethylcyclopentadienyl)(3-phenyl-2-phenoxy)titanium dichloride, diphenylmethylene(tetramethylcyclopentadienyl)(3-tert-butyldimethylsilyl-5-methyl-2-phenoxy)titanium dichloride, diphenylmethylene(tetramethylcyclopentadienyl)(3-trimethylsilyl-5-methyl-2-phenoxy)titanium dichloride, diphenylmethylene(tetramethylcyclopentadienyl)(3-tert-butyl-5-methoxy-2-phenoxy)titanium dichloride, diphenylmethylene(tetramethylcyclopentadienyl)(3-tert-butyl-5-chloro-2-phenoxy)titanium dichloride, diphenylmethylene(trimethylsilylcyclopentadienyl)(3,5-dimethyl-2-phenoxy)titanium dichloride, diphenylmethylene(trimethylsilylcyclopentadienyl)(3-tert-butyl-2-phenoxy)titanium dichloride, diphenylmethylene(trimethylsilylcyclopentadienyl)(3-tert-butyl-5-methyl-2-phenoxy)titanium dichloride, diphenylmethylene(trimethylsilylcyclopentadienyl)(3-phenyl-2-phenoxy)titanium dichloride, diphenylmethylene(trimethylsilylcyclopentadienyl)(3-tert-butyldimethylsilyl-5-methyl-2-phenoxy)titanium dichloride, diphenylmethylene(trimethylsilylcyclopentadienyl)(3-trimethylsilyl-5-methyl-2-phenoxy)titanium dichloride, diphenylmethylene(trimethylsilylcyclopentadienyl)(3-tert-butyl-5-methoxy-2-phenoxy)titanium dichloride, diphenylmethylene(trimethylsilylcyclopentadienyl)(3-tert-butyl-5-chloro-2-phenoxy)titanium dichloride, diphenylmethylene(fluorenyl)(3,5-dimethyl-2-phenoxy)titanium dichloride, diphenylmethylene(fluorenyl)(3-tert-butyl-2-phenoxy)titanium dichloride, diphenylmethylene(fluorenyl)(3-tert-butyl-5-methyl-2-phenoxy)titanium dichloride, diphenylmethylene(fluorenyl)(3-phenyl-2-phenoxy)titanium dichloride, diphenylmethylene(fluorenyl)(3-tert-butyldimethylsilyl-5-methyl-2-phenoxy)titanium dichloride, diphenylmethylene(fluorenyl)(3-trimethylsilyl-5-methyl-2-phenoxy)titanium dichloride, diphenylmethylene(fluorenyl)(3-tert-butyl-5-methoxy-2-phenoxy)titanium dichloride, diphenylmethylene(fluorenyl)(3-tert-butyl-5-chloro-2-phenoxy)titanium dichloride, compounds wherein titanium of these compounds is replaced by zirconium or hafnium, compounds wherein dichloride of these compounds is replaced by dibromide, diiodide, bis(dimethylamide), bis(diethylamide), di-n-butoxide or diisopropoxide, compounds wherein (cyclopentadienyl) of these compounds is replaced by (dimethylcyclopentadienyl), (trimethylcyclopentadienyl), (n-butylcyclopentadienyl), (tert-butyldimethylsilylcyclopentadienyl) or (indenyl), and compounds wherein (3,5-dimethyl-2-phenoxy) of these compounds is replaced by (2-phenoxy), (3-methyl-2-phenoxy), (3,5-di-tert-butyl-2-phenoxy), (3-phenyl-5-methyl-2-phenoxy), (3-tert-butyldimethylsilyl-2-phenoxy) or (3-trimethylsilyl-2-phenoxy); and transition metal complex wherein J is an atom of Group XIV of the Periodic Table of the Elements other than carbon atom, such as dimethylsilylene(cyclopentadienyl)(2-phenoxy)titanium dichloride, dimethylsilylene(cyclopentadienyl)(3-methyl-2-phenoxy)titanium dichloride, dimethylsilylene(cyclopentadienyl)(3,5-dimethyl-2-phenoxy)titanium dichloride, dimethylsilylene(cyclopentadienyl)(3-tert-butyl-2-phenoxy)titanium dichloride, dimethylsilylene(cyclopentadienyl)(3-tert-butyl-5-methyl-2-phenoxy)titanium dichloride, dimethylsilylene(cyclopentadienyl)(3,5-di-tert-butyl-2-phenoxy)titanium dichloride, dimethylsilylene(cyclopentadienyl)(5-methyl-3-phenyl-2-phenoxy)titanium dichloride, dimethylsilylene(cyclopentadienyl)(3-tert-butyldimethylsilyl-5-methyl-2-phenoxy)titanium dichloride, dimethylsilylene(cyclopentadienyl)(5-methyl-3- trimethylsilyl-2-phenoxy)titanium dichloride, dimethylsilylene(cyclopentadienyl)(3-tert-butyl-5-methoxy-2-phenoxy)titanium dichloride, dimethylsilylene (cyclopentadienyl)(3-tert-butyl-5-chloro-2-phenoxy) titanium dichloride, dimethylsilylene(cyclopentadienyl)(3,5-di-sec-amyl-2-phenoxy)titanium dichloride, dimethylsilylene(methylcyclopentadienyl)(2-phenoxy) titanium dichloride, dimethylsilylene (methylcyclopentadienyl)(3-methyl-2-phenoxy)titanium dichloride, dimethylsilylene(methylcyclopentadienyl)(3,5-dimethyl-2-phenoxy)titanium dichloride, dimethylsilylene (methylcyclopentadienyl)(3-tert-butyl-2-phenoxy)titanium dichloride, dimethylsilylene(methylcyclopentadienyl)(3-tert-butyl-5-methyl-2-phenoxy)titanium dichloride, dimethylsilylene(methylcyclopentadienyl)(3,5-di-tert-butyl-2-phenoxy)titanium dichloride, dimethylsilylene (methylcyclopentadienyl)(5-methyl-3-phenyl-2-phenoxy) titanium dichloride, dimethylsilylene (methylcyclopentadienyl)(3-tert-butyldimethylsilyl-5-methyl-2-phenoxy)titanium dichloride, dimethylsilylene (methylcyclopentadienyl)(5-methyl-3-trimethylsilyl-2-phenoxy)titanium dichloride, dimethylsilylene (methylcyclopentadienyl)(3-tert-butyl-5-methoxy-2-phenoxy)titanium dichloride, dimethylsilylene (methylcyclopentadienyl)(3-tert-butyl-5-chloro-2-phenoxy) titanium dichloride, dimethylsilylene (methylcyclopentadienyl)(3,5-di-sec-amyl-2-phenoxy) titanium dichloride, dimethylsilylene(n-butylcyclopentadienyl) (2-phenoxy)titanium dichloride, dimethylsilylene(n-butylcyclopentadienyl)(3-methyl-2-phenoxy)titanium dichloride, dimethylsilylene(n-butylcyclopentadienyl)(3,5-dimethyl-2-phenoxy)titanium dichloride, dimethylsilylene(n-butylcyclopentadienyl)(3-tert-butyl-2-phenoxy)titanium dichloride, dimethylsilylene (n-butylcyclopentadienyl)(3-tert-butyl-5-methyl-2-phenoxy)titanium dichloride, dimethylsilylene(n-butylcyclopentadienyl)(3,5-di-tert-butyl-2-phenoxy) titanium dichloride, dimethylsilylene(n-butylcyclopentadienyl)(5-methyl-3-phenyl-2-phenoxy) titanium dichloride, dimethylsilylene(n-butylcyclopentadienyl)(3-tert-butyldimethylsilyl-5-methyl-2-phenoxy)titanium dichloride, dimethylsilylene(n-butylcyclopentadienyl)(5-methyl-3-trimethylsilyl-2-phenoxy)titanium dichloride, dimethylsilylene(n-butylcyclopentadienyl)(3-tert-butyl-5-methoxy-2-phenoxy) titanium dichloride, dimethylsilylene(n-butylcyclopentadienyl)(3-tert-butyl-5-chloro-2-phenoxy) titanium dichloride, dimethylsilylene(n-butylcyclopentadienyl)(3,5-di-sec-amyl-2-phenoxy) titanium dichloride, dimethylsilylene(tert-butylcyclopentadienyl)(2-phenoxy)titanium dichloride, dimethylsilylene(tert-butylcyclopentadienyl)(3-methyl-2-phenoxy)titanium dichloride, dimethylsilylene(tert-butylcyclopentadienyl)(3,5-dimethyl-2-phenoxy)titanium dichloride, dimethylsilylene(tert-butylcyclopentadienyl)(3-tert-butyl-2-phenoxy)titanium dichloride, dimethylsilylene (tert-butylcyclopentadienyl)(3-tert-butyl-5-methyl-2-phenoxy)titanium dichloride, dimethylsilylene(tert-butylcyclopentadienyl)(3,5-di-tert-butyl-2-phenoxy) titanium dichloride, dimethylsilylene(tert-butylcyclopentadienyl)(5-methyl-3-phenyl-2-phenoxy) titanium dichloride, dimethylsilylene(tert-butylcyclopentadienyl)(3-tert-butyldimethylsilyl-5-methyl-2-phenoxy)titanium dichloride, dimethylsilylene(tert-butylcyclopentadienyl)(5-methyl-3-trimethylsilyl-2-phenoxy)titanium dichloride, dimethylsilylene(tert-butylcyclopentadienyl)(3-tert-butyl-5-methoxy-2-phenoxy) titanium dichloride, dimethylsilylene(tert-butylcyclopentadienyl)(3-tert-butyl-5-chloro-2-phenoxy) titanium dichloride, dimethylsilylene(tert-butylcyclopentadienyl)(3,5-di-sec-amyl-2-phenoxy) titanium dichloride, dimethylsilylene (tetramethylcyclopentadienyl)(2-phenoxy)titanium dichloride, dimethylsilylene(tetramethylcyclopentadienyl) (3-methyl-2-phenoxy)titanium dichloride, dimethylsilylene (tetramethylcyclopentadienyl)(3,5-dimethyl-2-phenoxy) titanium dichloride, dimethylsilylene (tetramethylcyclopentadienyl)(3-tert-butyl-2-phenoxy) titanium dichloride, dimethylsilylene (tetramethylcyclopentadienyl)(3-tert-butyl-5-methyl-2-phenoxy)titanium dichloride, dimethylsilylene (tetramethylcyclopentadienyl)(3,5-di-tert-butyl-2-phenoxy) titanium dichloride, dimethylsilylene (tetramethylcyclopentadienyl)(5-methyl-3-phenyl-2-phenoxy)titanium dichloride, dimethylsilylene (tetramethylcyclopentadienyl)(3-tert-butyldimethylsilyl-5-methyl-2-phenoxy)titanium dichloride, dimethylsilylene (tetramethylcyclopentadienyl)(5-methyl-3-trimethylsilyl-2-phenoxy)titanium dichloride, dimethylsilylene (tetramethylcyclopentadienyl)(3-tert-butyl-5-methoxy-2-phenoxy)titanium dichloride, dimethylsilylene (tetramethylcyclopentadienyl)(3-tert-butyl-5-chloro-2-phenoxy)titanium dichloride, dimethylsilylene (tetramethylcyclopentadienyl)(3,5-di-sec-amyl-2-phenoxy) titanium dichloride, dimethylsilylene (trimethylsilylcyclopentadienyl)(2-phenoxy)titanium dichloride, dimethylsilylene (trimethylsilylcyclopentadienyl)(3-methyl-2-phenoxy) titanium dichloride, dimethylsilylene (trimethylsilylcyclopentadienyl)(3,5-dimethyl-2-phenoxy) titanium dichloride, dimethylsilylene (trimethylsilylcyclopentadienyl)(3-tert-butyl-2-phenoxy) titanium dichloride, dimethylsilylene (trimethylsilylcyclopentadienyl)(3-tert-butyl-5-methyl-2-phenoxy)titanium dichloride, dimethylsilylene (trimethylsilylcyclopentadienyl)(3,5-di-tert-butyl-2-phenoxy)titanium dichloride, dimethylsilylene (trimethylsilylcyclopentadienyl)(5-methyl-3-phenyl-2-phenoxy)titanium dichloride, dimethylsilylene (trimethylsilylcyclopentadienyl)(3-tert-butyldimethylsilyl-5-methyl-2-phenoxy)titanium dichloride, dimethylsilylene (trimethylsilylcyclopentadienyl)(5-methyl-3-trimethylsilyl-2-phenoxy)titanium dichloride, dimethylsilylene (trimethylsilylcyclopentadienyl)(3-tert-butyl-5-methoxy-2-phenoxy)titanium dichloride, dimethylsilylene (trimethylsilylcyclopentadienyl)(3-tert-butyl-5-chloro-2-phenoxy)titanium dichloride, dimethylsilylene (trimethylsilylcyclopentadienyl)(3,5-di-sec-amyl-2-phenoxy)titanium dichloride, dimethylsilylene(indenyl)(2-phenoxy)titanium dichloride, dimethylsilylene(indenyl)(3-methyl-2-phenoxy)titanium dichloride, dimethylsilylene (indenyl)(3,5-dimethyl-2-phenoxy)titanium dichloride, dimethylsilylene(indenyl)(3-tert-butyl-2-phenoxy)titanium dichloride, dimethylsilylene(indenyl)(3-tert-butyl-5-methyl-2-phenoxy)titanium dichloride, dimethylsilylene(indenyl) (3,5-di-tert-butyl-2-phenoxy)titanium dichloride, dimethylsilylene(indenyl)(5-methyl-3-phenyl-2-phenoxy) titanium dichloride, dimethylsilylene(indenyl)(3-tert-butyldimethylsilyl-5-methyl-2-phenoxy)titanium dichloride, dimethylsilylene(indenyl)(5-methyl-3-trimethylsilyl-2-phenoxy)titanium dichloride, dimethylsilylene(indenyl)(3-tert-butyl-5-methoxy-2-phenoxy)titanium dichloride, dimethylsilylene(indenyl)(3-tert-butyl-5-chloro-2-phenoxy)titanium dichloride, dimethylsilylene(indenyl)(3,5-di-sec-amyl-2-phenoxy) titanium dichloride, dimethylsilylene(fluorenyl)(2-phenoxy) titanium dichloride, dimethylsilylene(fluorenyl)(3-methyl-2-phenoxy)titanium dichloride, dimethylsilylene(fluorenyl) (3,5-dimethyl-2-phenoxy)titanium dichloride, dimethylsilylene(fluorenyl)(3-tert-butyl-2-phenoxy) titanium dichloride, dimethylsilylene(fluorenyl)(3-tert-butyl-5-methyl-2-phenoxy)titanium dichloride, dimethylsilylene(fluorenyl)(3,5-di-tert-butyl-2-phenoxy) titanium dichloride, dimethylsilylene(fluorenyl)(5-methyl-3-phenyl-2-phenoxy)titanium dichloride, dimethylsilylene (fluorenyl)(3-tert-butyldimethylsilyl-5-methyl-2-phenoxy) titanium dichloride, dimethylsilylene(fluorenyl)(5-methyl-3-trimethylsilyl-2-phenoxy)titanium dichloride, dimethylsilylene(fluorenyl)(3-tert-butyl-5-methoxy-2-phenoxy)titanium dichloride, dimethylsilylene(fluorenyl)(3-tert-butyl-5-chloro-2-phenoxy)titanium dichloride, dimethylsilylene(fluorenyl)(3,5-di-sec-amyl-2-phenoxy) titanium dichloride, and dimethylsilylene (tetramethylcyclopentadienyl)(1-naphthox-2-yl)titanium dichloride; compounds wherein (cyclopentadienyl) of these compounds is replaced by (dimethylcyclopentadienyl), (trimethylcyclopentadienyl), (ethylcyclopentadienyl), (n-propylcyclopentadienyl), (isopropylcyclopentadienyl), (sec-butylcyclopentadienyl), (isobutylcyclopentadienyl), (tert-butyldimethylsilylcyclopentadienyl), (phenylcyclopentadienyl), (methylinderyl) or (phenylindenyl); compounds wherein (2-phenoxy) of these compounds is replaced by (3-phenyl-2-phenoxy), (3-trimethylsilyl-2-phenoxy) or (3-tert-butyldimethylsilyl-2-phenoxy); compounds wherein dimethylsilylene of these compounds is replaced by diethylsilylene, diphenylsilylene or dimethoxysilylene, compounds wherein titanium of these compounds is replaced by zirconium or hafnium; and compounds wherein dichloride of these compounds is replaced by dibromide, diiodide, bis(dimethylamide), bis (diethylamide), di-n-butoxide or diisopropoxide.

The transition metal complex represented by the above general formula [I] can be synthesized, for example, by a method disclosed in WO 97/03992.

The transition metal compound represented by the general formula [II] or [III] can be produced, for example, by reacting a transition metal compound represented by the general formula [I] with 0.5-fold by mole or 1-fold by mole of water. Wherein a method of directly reacting a transition metal compound with a required amount of water, a method of charging a transition metal compound in a solvent such as a hydrocarbon containing a required amount of water, or the like, a method of charging a transition metal compound represented by the general formula [I] in a solvent such as a dry hydrocarbon or the like and further flowing an inert gas containing a required amount of water, or the like, etc. can be adopted.

(B) Aluminum Compound

The aluminum compound (B) used in the present invention includes publicly known organoaluminum compounds, that is, at least one aluminum compound selected from (B1) to (B3) described below:

(B1) an organoaluminum compound represented by the general formula $E^1{}_aAlZ_{3-a}$;

(B2) a cyclic aluminoxane having a structure represented by the general formula $\{—Al(E^2)—O—\}_b$; and (B3) a linear aluminoxane having a structure represented by the general formula $E^3\{—Al(E^3)—O—\}_cAlE^3{}_2$ (wherein $E^1$, $E^2$ and $E^3$ respectively represent a hydrocarbon group, all of $E^1$, all of $E^2$ and all of $E^3$ may be the same or different; Z represents a hydrogen atom or a halogen atom, and all of Z may be the same or different; "a" represents a number satisfying the expression $0<a\leq 3$; "b" represents an integer of 2 or more and "c" represents an integer of 1 or more).

As the hydrocarbon group in $E^1$, $E^2$ or $E^3$, a hydrocarbon group having 1 to 8 carbon atoms is preferred and an alkyl group is more preferred.

Specific examples of the organoaluminum compound (B1) represented by $E^1{}_aAlZ_{3-a}$ include trialkylaluminums such as trimethylaluminum, triethylaluminum, tri-n-propylaluminum, triisopropylaluminum, triisobutylaluminum, tri-n-hexylaluminum, etc.; dialkylaluminum chlorides such as dimethylaluminum chloride, diethylaluminum chloride, di-n-propylaluminum chloride, diisopropylaluminum chloride, diisobutylaluminum chloride, di-n-hexylaluminum chloride, etc.; alkylaluminum dichlorides such as methylaluminum dichloride, ethylaluminum dichloride, n-propylaluminum dichloride, isopropylaluminum dichloride, isobutylaluminum dichloride, n-hexylaluminum dichloride, etc.; and dialkylaluminum hydrides such as dimethylaluminum hydride, diethylaluminum hydride, di-n-propylaluminum hydride, diisobutylaluminum hydride, di-n-hexylaluminum hydride, etc.

Among them, trialkylaluminum is preferred and triethylaluminum or triisobutylaluminum is more preferred.

Specific examples of $E^2$ and $E^3$ in (B2) a cyclic aluminoxane having a structure represented by the general formula $\{—Al(E^2)—O—\}_b$ and (B3) a linear aluminoxane having a structure represented by the general formula $E^3\{—Al(E^3)—O—\}_cAlE^3{}_2$ include alkyl groups such as methyl group, ethyl group, n-propyl group, isopropyl group, n-butyl group, isobutyl group, n-pentyl group, neopentyl group, etc. "b" is an integer of 2 or more, "c" is an integer of 1 or more. Each of $E^2$ and $E^3$ is preferably a methyl group or isobutyl group. "b" is preferably from 2 to 40 and c is preferably from 1 to 40.

The above aluminoxane is prepared by various methods. The method is not specifically limited, and the aluminoxane may be prepared according to a publicly known method. For example, the aluminoxane can be prepared by contacting a solution obtained by dissolving a trialkylaluminum (e.g. trimethylaluminum) in a suitable organic solvent (e.g. benzene, aliphatic hydrocarbon) with water. Also, there can be illustrated a method for preparing the aluminoxane by contacting a trialkylaluminum (e.g. trimethylaluminum, etc.) with a metal salt containing crystal water (e.g. copper sulfate hydrate, etc.).

(C) Boron Compound

As the boron compound (C) in the present invention, there can be used any one of (C1) a boron compound represented by the general formula $BQ^1Q^2Q^3$, (C2) a boron compound represented by the general formula $G^+(BQ^1Q^2Q^3Q^4)^-$ and (C3) a boron compound represented by the general formula $(L-H)^+(BQ^1Q^2Q^3Q^4)^-$.

In the boron compound (C1) represented by the general formula $BQ^1Q^2Q^3$, B represents a boron atom in the trivalent valence state; $Q^1$ to $Q^3$ may be the same or different and represent a halogen atom, a hydrocarbon group, a halogenated hydrocarbon group, a substituted silyl group, an alkoxy group or a di-substituted amino group. Each of $Q^1$ to $Q^3$ is preferably a halogen atom, a hydrocarbon group having 1 to 20 carbon atoms, a halogenated hydrocarbon group having 1 to 20 carbon atoms, a substituted silyl group having 1 to 20 carbon atoms, an alkoxy group having 1 to 20 carbon atoms or an amino group having 2 to 20 carbon atoms, more preferably a hydrocarbon group having 1 to 20 carbon atoms or a halogenated hydrocarbon group having 1 to 20 carbon atoms. More preferably, $Q^1$ to $Q^3$ are a fluorinated hydrocarbon group having 1 to 20 carbon atoms and containing at least one fluorine atom, and most preferably, $Q^1$ to $Q^3$ are a fluorinated aryl group having 6 to 20 carbon atoms and containing at least one fluorine atom.

Specific examples of the compound (C1) include tris(pentafluorophenyl)borane, tris(2,3,5,6-tetrafluorophenyl)borane, tris(2,3,4,5-tetrafluorophenyl)borane, tris(3,4,5-trifluorophenyl)borane, tris(2,3,4-trifluorophenyl)borane, phenylbis(pentafluorophenyl)borane, etc., most preferably tris(pentafluorophenyl)borane.

In the boron compound (C2) represented by the general formula $G^+(BQ^1Q^2Q^3Q^4)^-$, $G^+$ represents an inorganic or organic cation; B represents a boron atom in the trivalent valence state; and $Q^1$ to $Q^4$ are the same as defined above for in $Q^1$ to $Q^3$ in (C1).

Specific examples of $G^+$ as an inorganic cation in the compound represented by the general formula $G^+(BQ^1Q^2Q^3Q^4)^-$ include a ferrocenium cation, alkyl-substituted ferrocenium cation, silver cation, etc. Examples of the $G^+$ as an organic cation include a triphenylmethyl cation. $G^-$ is preferably a carbenium cation, particularly a triphenylmethyl cation. Examples of $(BQ^1Q^2Q^3Q^4)^-$ include tetrakis(pentafluorophenyl)borate, tetrakis(2,3,5,6-tetrafluorophenyl)borate, tetrakis(2,3,4,5-tetrafluorophenyl)borate, tetrakis(3,4,5-trifluorophenyl)borate, tetrakis(2,3,4-trifluorophenyl)borate, phenyltris(pentafluorophenyl)borate, tetrakis(3,5-bistrifluoromethylphenyl)borate, etc.

Specific combinations of them include ferroceniumtetrakis(pentafluorophenyl)borate, 1,1'-dimethylferroceniumtetrakis(pentafluorophenyl)borate, silvertetrakis(pentafluorophenyl)borate, triphenylmethyltetrakis(pentafluorophenyl)borate, triphenylmethyltetrakis(3,5-bistrifluoromethylphenyl)borate, etc., most preferably triphenylmethyltetrakis(pentafluorophenyl)borate.

In the boron compound (C3) represented by the formula $(L-H)^+(BQ^1Q^2Q^3Q^4)^-$, L represents a neutral Lewis base; $(L-H)^+$ represents a Brønsted acid; B represents a boron atom in the trivalent valence state; and $Q^1$ to $Q^4$ are the same as defined above for $Q^1$ to $Q^3$ in (C1).

Specific examples of $(L-H)^+$ as a Brønsted acid in the compound represented by the formula $(L-H)^+(BQ^1Q^2Q^3Q^4)^-$ include trialkyl-substituted ammoniums, N,N-dialkylaniliniums, dialkylammoniums, triarylphosphoniums, etc., and examples of $(BQ^1Q^2Q^3Q^4)^-$ include those as defined above.

Specific combinations of them include triethylammoniumtetrakis(pentafluorophenyl)borate, tripropylammoniumtetrakis(pentafluorophenyl)borate, tri(n-butyl)ammoniumtetrakis(pentafluorophenyl)borate, tri(n-butyl)ammoniumtetrakis(3,5-bistrifluoromethylphenyl)borate, N,N-dimethylaniliniumtetrakis(pentafluorophenyl)borate, N,N-diethylaniliniumtetrakis(pentafluorophenyl)borate, N,N-2,4,6-pentamethylaniliniumtetrakis(pentafluorophenyl)borate, N,N-dimethylaniliniumtetrakis(3,5-bistrifluoromethylphenyl)borate, diisopropylammoniumtetrakis (pentafluorophenyl)borate, dicyclohexylammoniumtetrakis (pentafluorophenyl)borate, triphenylphosphoniumtetrakis(pentafluorophenyl)borate, tri(methylphenyl)phosphoniumtetrakis(pentafluorophenyl)borate, tri(dimethylphenyl)phosphoniumtetrakis(pentafluorophenyl)borate, etc., most preferably tri(n-butyl)ammoniumtetrakis(pentafluorophenyl)borate or N,N-dimethylanilinumtetrakis(pentafluorophenyl)borate.

[Polymerization]

In the present invention, a catalyst for olefin polymerization prepared by contacting a compound (A) with a compound (B) and/or a compound (C) is used. In case of using a catalyst for olefin polymerization prepared by contacting the component (A) with the component(B), the above cyclic aluminoxane (B2) and/or linear aluminoxane (B3) are preferable as the component(B). Another preferable embodiment of the catalyst for olefin polymerization includes a catalyst for olefin polymerization prepared by contacting the above (A), (B) and (C), together. As the component (B), the above (B1) is easily used.

The respective components are desirably used so that a molar ratio of (B)/(A) is usually within the range from 0.1 to 10000, preferably 5 to 2000 and a molar ratio of (C)/(A) is usually within the range from 0.01 to 100, preferably 0.5 to 10.

When the respective components are used in the state of a solution or state suspended in a solvent, the concentration of the respective components is appropriately selected according to the conditions such as ability of an apparatus for feeding the respective components in a polymerization reactor. The respective components are desirably used so that the concentration of (A) is usually from 0.01 to 500 $\mu$mol/g, preferably from 0.05 to 100 $\mu$mol/g, more preferably from 0.05 to 50 $\mu$mol/g; the concentration of (B) is usually from 0.01 to 10000 $\mu$mol/g, preferably from 0.1 to 5000 $\mu$mol/g, more preferably from 0.1 to 2000 $\mu$mol/g, in terms of Al atom; and the concentration of (C) is usually from 0.01 to 500 $\mu$mol/g, preferably from 0.05 to 200 $\mu$mol/g, more preferably from 0.05 to 100 $\mu$mol/g.

As the catalyst used in the present invention, a particle-like carrier including an inorganic carrier such as $SiO_2$, $Al_2O_3$ or the like, or an organic polymer carrier such as a polymer of ethylene, styrene or the like, may be further used in combination.

The process for polymerizing the ethylene-alkenyl aromatic compound copolymer of the present invention is not specifically limited, and examples include a liquid phase polymerization process, a high pressure ionic polymerization process and a gas phase polymerization process. Both of a batch-wise process and a continuous process can be conducted as the polymerization form. As a reactor, a stirring vessel type reactor or a tubular reactor can be usually used. The polymerization can be performed in a single reaction zone. Alternatively, the polymerization can also be performed by partitioning one reactor into a plurality of reaction zones or connecting a plurality of reactors in series or parallel. In case of using a plurality of reactors, a combination of a vessel reactor and a vessel reactor, or a combination of a vessel reactor and a tubular reactor may be used. In a polymerization process using a plurality of reaction zones or a plurality of reactors, polymers having different characteristics can also be produced by changing the temperature, pressure and gas composition of respective reaction zones. Further, a chain transfer agent such as hydrogen or the like can be added for controlling the molecular weight of the ethylene-alkenyl aromatic compound copolymer in the present invention.

When the polymerization is carried out by a liquid phase polymerization process, solvents used include a saturated hydrocarbon solvent such as butane, hexane, heptane, or the like and an aromatic hydrocarbon solvent such as toluene, xylene or the like. The polymerization temperature is usually a range of 10 to 120° C., and the pressure of ethylene is usually a range of 0.1 to 5 MPa.

When the polymerization is carried out by a high pressure ionic polymerization process, the polymerization is carried out under a pressure of 25 to 500 Mpa in usual at a temperature of 130 to 350° C. in usual, and it is preferable to carry out the polymerization in a state of non solvent from the viewpoint of molecular weight.

When the polymerization is carried out by a gas phase polymerization process, the polymerization temperature is usually a range of 50 to 100° C., and the pressure of ethylene is usually a range of 1 to 5 MPa.

Further, as the ethylene-alkenyl aromatic compound copolymer of the present invention has the above-mentioned good properties, it is suitable for molded articles such as films, sheets or containers or the like. Particularly, a film obtained by an inflation molding in which a molten ethylene-alkenyl aromatic compound copolymer of the present invention is extruded from a circular die and then a film inflated in tubular shape is wound up, by a T-die film molding in which a molten ethylene-alkenyl aromatic compound copolymer of the present invention is extruded from a linear T-die and the extruded film is wound up, etc. and a sheet obtained by a calendering or the like are extremely suitable for packaging materials, sheet materials and the like because of their superior mechanical properties and the like.

Further, a multi-layer article composed of the film or sheet with one or more of other raw materials can be produced by a known lamination process such as a co-extrusion process, a dry-lamination process, a sandwich-lamination process, an extrusion-lamination process or the like. As the other raw materials, there are illustrated known raw materials such as a paper, a paperboard, an aluminum foil, a cellophane, a nylon, a polyethylene terephthalate(PET), a polypropylene, a polyvinylidene chloride, a saponified product of ethylene-vinyl acetate copolymer(EVOH), various kinds of adhesive resins, and the like. Molded articles obtained by a blow molding and an injection molding are also extremely suitable for container materials and the like because of their superior mechanical properties and the like.

The molded articles such as films, sheets and shaped articles(e.g. containers) of the present invention can contain known additives such as antioxidants, weather resistant agents, lubricants, anti-blocking agents, anti-static agents, anti-fogging agents, pigments, fillers and the like. Further, known polymer substances such as a low density polyethylene obtained by a radical polymerization process, a high density polyethylene, a linear low density polyethylene, an ethylene-α-olefin copolymer elastomer, a polypropylene and the like may be blended.

The film or sheet of the present invention can be subjected to known post-treatment such as a corona discharge treatment, a plasma treatment, an ozone treatment, an ultra-violet rays irradiation, an electron beam irradiation or the like.

As described above, an ethylene-alkenyl aromatic compound copolymer having an excellent processability can be provided according to the present invention.

Further, the present invention can provide a process for efficiently producing the above-mentioned ethylene-alkenyl aromatic compound copolymer.

Further, the present invention can provide a film or sheet of the above-mentioned ethylene-alkenyl aromatic compound copolymer.

Further, the present invention can provide a shaped article of the above-mentioned ethylene-alkenyl aromatic compound copolymer.

EXAMPLES

The present invention is illustrated in accordance with Examples, but the present invention is not limited thereto.

Further, among measurements and evaluations, the melt viscosity $\eta^*_{\#}$, the molecular weight distribution Mw/Mn, the zero-shear melt viscosity $\eta^*_0$(poise) at 190° C., and the characteristic relaxation time $\tau_0$(sec.) were carried out according to the fore-mentioned methods. A melting point, a glass transition point and a tensile impact strength were carried out below.

(1) Melting point

The melting point means a melt peak temperature measured by which 10 mg of a sample is packed in an aluminum pan, retained at 150° C. for 2 minutes, successively cooled to 40° C. at 5° C./min., retained at 40° C. for 2 minutes, and then heated to 150° C. at 5° C./min., using a differential scanning calorimeter, DSC-7 type equipment manufactured by Perkin-Elmer Co.,.

(2) Glass transition point

The glass transition point was measured under conditions below using a differential scanning calorie meter, SSC-5200 equipment manufacture by Seiko Electronics Co., Ltd., and determined by its inflection point.

Heating: 20° C. to 200° C. (20° C./min.), retention for 10 min.

Cooling: 200° C. to −50° C. (20° C./min.), retention for 10 min.

Measurement: −50° C. to 300° C. (20° C./min.)

(3) The molecular weight and molecular weight distribution were determined under conditions below using a Gel Permeation Chromatograph (800 series manufacture by Nippon Bunko Co., Ltd.).

Column: Shodex A806M

Measurement temperature: 450° C.,

Measurement solvent: tetrahydrofuran

Measurement concentration: 0.5 mg/ml (4) The content of styrene units in a polymer and the structure of the polymer were determined according to $^{13}$C-NMR analysis (JNM-EX270 manufactured by JEOL LTD.).

Measurement solvent: a mixed liquid of o-dichlorobenzene and deuterated benzene at a weight ratio of 85:15

Measurement temperature: 135° C.

(5) Tensile impact strength:

The tensile impact strength was measured according to ASTMD D1822-68.

(6) The tensile test of a polymer was carried out under conditions below using a STROGRAPH-T (manufactured by Toyo Seiki Seisakusho Co., Ltd.), and a hysteresis curve at 2-fold magnification of tensile strength and an elongation rate (%) till rupture were determined.

Test piece: Press sheet of 120 mm ×20 mm ×0.3 mm

Tensile rate: 200 mm/min.

Distance between chucks: 60 mm (7) The refractive index of a polymer was determined with an Abbe refractometer type 3 (manufactured by Atago Co., Ltd.) by measuring a test piece which was obtained by cutting into a size of 10 mm ×30 mm a film of 100 μm thickness molded by carrying out hot-press at 180° C. for 3 minutes under a pressure of 3 to 5 MPa after pre-heating at 180° C. for 3 minutes.

Example 1

After evacuating an inner volume of 5-liter autoclave with a stirrer, 72 ml of hydrogen as a molecular weight-controlling agent, 2-liter of hexane as a solvent and 22 ml of styrene were charged, and the reactor was heated to 80° C. Successively, ethylene was fed while controlling a pressure of 12 kg/cm$^2$, and after the system was stabilized, 1.5 mmol of triisobutylaluminum, 12 μmol of isopropylidene (cyclopentadienyl)(3-tert-butyl-5-methyl-2-phenoxy) titanium dichloride of the following structure formula synthesized according to the process described in the example 1 of Japanese Patent Publication (Kokai) No.09-087313, and 28 μmol of N,N-dimethylaniliniumtetrakis (pentafluorophenyl)borate were successively charged to start the polymerization. The polymerization was terminated by charging 10 ml of ethanol after 8 minutes. A white solid precipitated by charging the polymerization reaction solution into a large amount of ethanol was filtrated and dried under vacuum over a night to obtain 42 g of an ethylene-styrene copolymer having a melt viscosity $\eta^*_{190}$ of $1.79 \times 10^4$ poises, a melting point of 106.4° C., a Mw of 80,400 and a Mw/Mn of 1.9. The zero-shear melt viscosity $\eta^*_0$ of the ethylene-styrene copolymer obtained was $2.40 \times 10^5$ poises, and the characteristic relaxation time $\tau_0$ was 2.226 sec. Further, the tensile impact strength TI was 2120 kg·cm/cm$^2$. The result is shown in Table 1.

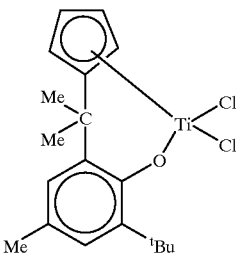

Example 2

Example 1 was repeated except that the charge amount of styrene was changed to 30 ml to obtain 38 g of an ethylene-styrene copolymer having a melt viscosity $\eta^*_{190}$ of $1.61 \times 10^4$ poises, a melting point of 100.7° C., a Mw of 71,700 and a Mw/Mn of 1.9. The zero-shear melt viscosity $\eta^*_0$ of the ethylene-styrene copolymer obtained was $1.05 \times 10^5$ poises, and the property relaxation time $\tau_0$ was 0.507 sec. Further, the tensile impact strength TI was 2880 kg·cm/cm$^2$. The result is shown in Table 1.

Example 3

In a 400 ml autoclave which had been replaced with argon, 55 ml of styrene, 50 μl of a toluene solution (0.1 mol/l) of divinylbenzene and 27 ml of dry toluene were previously charged, and then ethylene was fed at a pressure of 8 kg/cm$^2$. Further, 2 mmol of triisobutylaluminum, 3 mg of isopropylidene(cyclopentadienyl)(3-tert-butyl-5-methyl-2-phenoxy)titanium dichloride and 22.2 mg of triphenylmethyltetrakis(pentafluorophenyl)borate were charged, and the reaction solution was stirred at 60° C. for 1 hour. Then, the polymerization was terminated by charging 10 ml of methanol, and a white solid precipitated by charging the polymerization reaction solution into a large amount of ethanol was filtrated and dried under vacuum over a night to obtain 19.4 g of an ethylene-styrene copolymer having a melt viscosity $\eta^*_{190}$ of $3.42 \times 10^4$ poises, a glass transition point of 26° C., a Mw of 573,000 and a Mw/Mn of 2.1. The zero-shear melt viscosity $\eta^*_0$ of the ethylene-styrene copolymer obtained was $4.85 \times 10^5$ poises, and the characteristic relaxation time $\tau_0$ was 0.268 sec. The result is shown in Table 1.

Comparative Example 1

Polymerization was carried out in the same manner as in Example 1 except that 1.5 μmol of dimethylsilylene (tetramethylcyclopentadienyl)(3-tert-butyl-amido)titanium dichloride synthesized according to the process described in the example 2 of Japanese Patent Publication (Kokai) No.03-163088 in place of isopropylidene(cyclopentadienyl) (3-tert-butyl-5-methyl-2-phenoxy)titanium dichloride and 4.5 μmol of N,N-dimethylaniliniumtetrakis (pentafluorophenyl)borate were used, the charge amount of styrene was changed to 150 ml, and polymerization time was changed to 6 minutes. As a result of the polymerization, 42 g of an ethylene-styrene copolymer having a melt viscosity $\eta^*_{190}$ of $1.44 \times 10^4$ poises, a melting point of 114.9° C., a Mw of 71,700 and a Mw/Mn of 2.3. The zero-shear melt viscosity $\eta^*_0$ of the ethylene-styrene copolymer obtained was $3.185 \times 10^4$ poises, and the characteristic relaxation time $\tau_0$ was 0.013 sec. Further, the tensile impact strength TI was 1800 kg·cm/cm$^2$. The result is shown in Table 1.

As shown in Table 1, the ethylene-alkenyl aromatic compound copolymer of the present invention attained a balance between the zero-shear melt viscosity and the property relaxation time which cannot be conventionally found, is extremely superior in processability and sufficiently superior in the tensile impact strength of a press-molded article of said copolymer.

TABLE 1

|  | Example 1 | Example 2 | Example 3 | Comparative Example 1 |
|---|---|---|---|---|
| Catalyst component | Complex I | Complex I | Complex I | Complex II |
| Alkenyl aromatic compound | Styrene | Styrene | Styrene | Styrene |
| Diene compound | — | — | Divinyl-benzene | — |
| $\eta^*_{190}$ (poise) | 17,900 | 16,100 | 34,200 | 14,400 |
| Melting point (° C.) | 106.4 | 100.7 | — | 114.9 |
| Glass transition point (° C.) | — | — | 26 | — |
| Mw | 80,400 | 71,700 | 573,000 | 71,700 |
| Mw/Mn | 1.9 | 1.9 | 2.1 | 2.3 |
| $\eta^*_0$ (poise) | 240,000 | 105,000 | 485,000 | 31,850 |
| $\tau_0$ (sec.) | 2.226 | 0.507 | 0.268 | 0.013 |
| Log $\tau_0$ | 0.348 | −0.295 | −0.572 | −1.89 |
| A | −1.00 | −1.36 | −0.694 | −1.88 |

Complex I: isopropylidene(cyclopentadienyl) (3-tert-butyl-5-methyl-2-phenoxy)titanium dichloride
Complex II: dimethylsilylene(tetramethylcyclopentadienyl) (3-tert-butyl-amido)titanium dichloride
A: log $\eta^*_0$ −6.38 [Right side of the expression (1)]

Example 4

In a 400 ml autoclave which had been replaced with argon, 27 ml of styrene, 25 μl of a toluene solution (0.1 mol/l) of divinylbenzene (p-divinylbenzene manufactured by Nissei Chemical Co. Ltd.) and 71 ml of dry toluene were previously charged, and then ethylene was fed at a pressure of 0.8 MPa. After previously mixing 2.0 ml of a toluene solution of triisobutylaluminum (manufactured by Toso-Akzo Co. Ltd., 1 mol/l) and a solution in which 3.0 mg of isopropylidene(cyclopentadienyl)(3-tert-butyl-5-methyl-2-phenoxy)titanium dichloride was dissolved in 4 ml of dry toluene, the mixture was charged, successively a solution in which 22.2 mg of triphenylmethyltetrakis (pentafluorophenyl)borate was dissolved in 4.8 ml of dry toluene was charged, and the reaction solution was stirred at 60° C. for 1 hour. Then, the reaction solution was charged in a mixture of 5 ml of hydrogen chloride (12N) and 1000 ml of acetone, and a white solid precipitated was obtained by filtration. After said solid was washed with acetone, and then dried under vacuum to obtain 8.34 g of a polymer.

The polymer had a Mn of 241,000, a Mw/Mn of 2.07 and a styrene unit content of 35 mol %. A class transition point was 11° C. and a melting point could not be confirmed. Further, the refractive index of the film of said polymer was 1.562. The ratio of an area of a peak appearing at 34.0 to 36.0 ppm in a $^{13}$C-NMR spectrum to an area of a peak appearing at 36.0 to 38.0 ppm was 0.09.

The hysteresis curve of said polymer is shown in FIG. 1.

The polymer was superior in flexibility, and a measured test piece after measurement recovered nearly 100% of a state before measurement. Further, the elongation at break was 403% and the mechanical strength was good. A press sheet prepared for measurement had a very high transparency. No peak which is derived from an aliphatic double bond(vinyl group) of divinyl benzene polymerized, was observed.

Example 5

In a 400 mL autoclave which had been replaced with argon, 55 ml of styrene, 1.25 ml of a toluere solution (0.1 mol/l) of divinylbenzene (p-divinylbenzene manufactured by Nissei Chemical Co. Ltd.) and 19 ml of dry toluene were previously charged, and then propylene was fed at a pressure of 0.8 MPa. After previously mixing a solution in which 6.0 mg of isopropylidene(cyclopentadienyl)(3-tert-butyl-5-methyl-2-phenoxy)titanium dichloride was dissolved in 8 ml of dry toluene and 4.0 ml of a toluene solution of triisobutylaluminum (manufactured by Toso-Akzo Co. Ltd., 1 mol/l), the mixture was charged, successively a solution in which 44.3 mg of triphenylmethyltetrakis (pentafluorophenyl) borate was dissolved in 9.6 ml of dry toluene was charged, and the reaction solution was stirred at 60° C. for 1 hour. Then, the reaction solution was charged in a mixture of 5 ml of hydrogen chloride (12N) and 1000 ml of acetone, and a white solid precipitated was obtained by filtration. The solid was washed with acetone, and then dried under vacuum to obtain 6.88 q of a polymer.

The polymer had a Mn of 82,000, and a Mw/Mn of 1.97. A glass transition point was 33° C. and a melting point could not be substantially confirmed. Further, the refractive index of the film of said polymer was 1.522. Further, a press sheet prepared for measurement had a very high transparency. No peak which is derived from an aliphatic double bond(vinyl group) of divinyl benzene polymerized, was observed.

What is claimed is:

1. An ethylene-mono-alkenyl aromatic compound copolymer, said copolymer having a melt viscosity $\eta^*_{100}$ at a shear rate of 100 radian/second at 190° C. of $3.0\times10^3$ to $3.0\times10^6$ poises and a molecular weight distribution in terms of weight average molecular weight(Mw) to number average molecular weight(Mn)[Mw/Mn] of 1.2 to 4.0, and wherein a zero-shear melt viscosity $\eta^*_0$ (poise) and a characteristic relaxation time $\tau_0$ (second) of the copolymer satisfy the relation of the expression (1) below;

$$\log \tau_0 > \log \eta^*_0 - 6.38 \qquad (1).$$

2. The copolymer according to claim 1, wherein the copolymer is a binary copolymer of ethylene and a mono-alkenyl aromatic compound.

3. The copolymer according to claim 1, wherein the copolymer is a ternary copolymer of ethylene, amono-alkenyl aromatic compound and a diene, and contains no vinyl group derived from the diene.

4. The copolymer according to claim 3, wherein the diene is a bis-alkenyl aromatic hydrocarbon.

5. The copolymer according to claim 4, wherein the bis-alkenyl aromatic hydrocarbon is divinylbenzene.

6. The copolymer according to claim 2, wherein the copolymer has a ratio (②/③) of an area of a peak ② appearing at 34.0 to 36.0 ppm in a $^{13}$C-NMR spectrum to an area of a peak ③ appearing at 36.0 to 38.0 ppm, of 0.01 to 0.25.

7. The copolymer according to claim 3, wherein the copolymer has a ratio (②/③) of an area of a peak ② appearing at 34.0 to 36.0 ppm in a $^{13}$C-NMR spectrum to an area of a peak ③ appearing at 36.0 to 38.0 ppm, of 0.01 to 0.25.

8. A process for producing the copolymer of claim 1, which comprises copolymerizing ethylene with a mono-alkenyl aromatic hydrocarbon in the presence of a catalyst prepared by contacting (A) with (B), (A) with (C), or (A) with (B) and (C) described below:

(A): a transition metal complex represented by the following general formula [I], [II] or [III]:

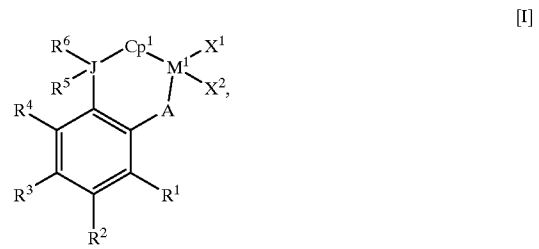

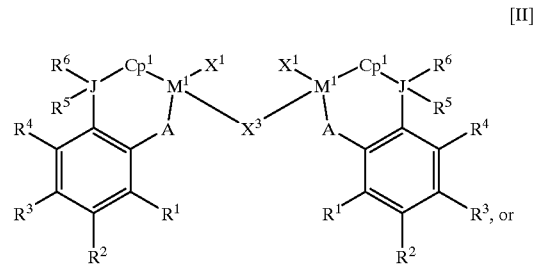

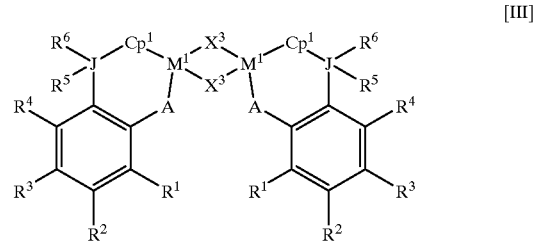

wherein $M^1$ indicates a transition metal atom of the Group IV of the Periodic Table of the Elements, A indicates an atom of the Group XVI of the Periodic Table of the Elements, J indicates an atom of the Group XIV of the Periodic Table of the Elements, $Cp^1$ indicates a group having a cyclopentadiene type anion skeleton, each of $X^1$, $X^2$, $R^1$, $R^2$, $R^3$, $R^4$, $R^5$ and $R^6$ independently indicates a hydrogen atom, a halogen atom, an alkyl group, an aralkyl group, an aryl group, a substituted silyl group, an alkoxy group, an aralkyloxy group, an aryloxy group or a di-substituted amino group, $X^3$ indicates an atom of Group XVI of the Periodic Table of the Elements, $R^1$, $R^2$, $R^3$, $R^4$, $R^5$ and $R^6$ may be optionally combined with each other to form a ring; and in the general formula [II] or [III], two of $M^1$, A, J, $Cp^1$, $X^1$, $X^2$, $X^3$, $R^1$, $R^2$, $R^3$, $R^4$, $R^5$ and $R^6$ may be respectively the same or different;

(B) one or more aluminum compounds selected from the following (B1) to (B3);
  (B1) an organoaluminum compound represented by the general formula $E^1_a AlZ_{3-a}$,
  (B2) a cyclic aluminoxane having a structure represented by the general formula $\{-Al(E^2)-O-\}_b$, and
  (B3) a linear aluminoxane having a structure represented by the general formula $E^3\{-Al(E^3)-O-\}_c AlE^3_2$,
  wherein $E^1$, $E^2$ and $E^3$ respectively represent a hydrocarbon group, all of $E^1$, all of $E^2$ and all of $E^3$ may be the same or different, Z represents a hydrogen atom or a halogen atom, and all of Z may be the same or different, "a" represents a number satisfying the expression $0 < a \leq 3$, "b" represents an integer of 2 or more and "c" represents an integer of 1 or more; and (C) a boron compound of any one of the following (C1) to (C3):
  (C1) a boron compound represented by the general formula $BQ^1Q^2Q^3$,
  (C2) a boron compound represented by the general formula $G^+(BQ^1Q^2Q^3Q^4)^-$, and
  (C3) a boron compound represented by the general formula $(L-H)^+(BQ^1Q^2Q^3Q^4)^-$,
  wherein B represents a boron atom in the trivalent valence state, $Q^1$ to $Q^4$ may be the same or different and respectively represent a halogen atom, a hydrocarbon group, a halogenated hydrocarbon group, a substituted silyl group, an alkoxy group or a di-substituted amino group, $G^+$ represents an inorganic or organic cation, L represents a neutral Lewis base, and $(L-H)^+$ represents a Brfnsted acid.

9. A molded article comprising the copolymer of claim 1.

10. A molded article comprising the copolymer of claim 2.

11. A molded article comprising the copolymer of claim 3.

12. The molded article according to claim 9, wherein the molded article is a sheet or film.

13. The molded article according to claim 10, wherein the molded article is a sheet or film.

14. The molded article according to claim 11, wherein the molded article is a sheet or film.

* * * * *